United States Patent [19]

Mizoguchi et al.

[11] Patent Number: 5,438,437
[45] Date of Patent: Aug. 1, 1995

[54] IMAGE FORMING APPARATUS WITH EXPOSURE, SIZE, AND POSITION CORRECTION FOR PIXELS

[75] Inventors: Yoshimi Mizoguchi; Hiroshi Ishii; Kiyoshi Kimura; Masakazu Fukuchi; Makoto Takeda; Hiroyuki Maruyama; Yasuhiko Yamaguchi; Kenji Taki; Masashi Akamatsu; Takao Kurohata, all of Hachioji, Japan

[73] Assignee: Konica Corporation, Tokyo, Japan

[21] Appl. No.: 959,664

[22] Filed: Oct. 13, 1992

[30] Foreign Application Priority Data

Oct. 17, 1991 [JP] Japan .................. 3-269594
Jul. 24, 1992 [JP] Japan .................. 4-198747
Jul. 24, 1992 [JP] Japan .................. 4-198748
Jul. 24, 1992 [JP] Japan .................. 4-198749

[51] Int. Cl.$^6$ .............. H04N 1/23; G01D 15/06; G01D 15/14
[52] U.S. Cl. .................. 358/518; 358/520; 358/521; 358/528; 358/300; 347/118; 347/132; 347/135
[58] Field of Search .............. 346/108, 157, 160; 358/298, 518, 520, 521, 534, 528, 300

[56] References Cited

U.S. PATENT DOCUMENTS

| | | | |
|---|---|---|---|
| 4,150,400 | 4/1979 | Wong | 358/260 |
| 4,460,909 | 7/1984 | Bassetti et al. | 346/160 |
| 4,544,264 | 10/1985 | Bassetti et al. | 346/160 X |
| 4,677,493 | 6/1987 | Shinya | 358/283 |
| 4,814,797 | 3/1989 | Haneda et al. | 346/157 |
| 4,868,587 | 9/1989 | Loce et al. | 346/160 X |
| 5,062,002 | 10/1991 | Dahlquist et al. | 358/298 |
| 5,128,698 | 7/1992 | Crawford et al. | 346/160 |
| 5,162,821 | 11/1992 | Fukuchi et al. | 346/157 |
| 5,189,441 | 2/1993 | Fukui et al. | 346/160 |
| 5,220,416 | 1/1993 | Hasebe et al. | 358/75 |
| 5,241,324 | 8/1993 | Tamura et al. | 346/1.1 |
| 5,252,995 | 10/1993 | Trask et al. | 346/157 |
| 5,299,308 | 3/1994 | Suzuki et al. | 358/456 X |

FOREIGN PATENT DOCUMENTS

0271052 6/1988 European Pat. Off. .
3610465A1 10/1986 Germany .

OTHER PUBLICATIONS

Patent Abstracts of Japan, vol. 013, No. 429 (E-823) Sep. 25, 1989 & JP-A-01 160 182 (Canon Inc.) Jun. 23, 1989.

Primary Examiner—Benjamin R. Fuller
Assistant Examiner—Randy W. Gibson
Attorney, Agent, or Firm—Frishauf, Holtz, Goodman & Woodward

[57] ABSTRACT

An electrophotographic color image forming machine registers which a second color toner image on a first color toner image which has been previously formed on an image carrier to form a color image. The registered images are then transferred onto a recording sheet. The machine includes control apparatus that includes first and second exposure control modulators which respectively control an exposure amount of at least one of the first color toner images and the second color toner image. A smoothing processor controls at least one of a size and a position of at least one of the first and second color toner dot images within each of a plurality of pixels and a discriminator determines whether one of the size and the position of the dot image should be controlled. A hue corrector is provided which adjusts a ratio of the exposure amounts provided by the first and second exposure control modulators to control the first and second exposure control modulators on the basis of a discriminator result of the discriminator.

7 Claims, 19 Drawing Sheets

FIG. 5

| | CONTENT OF DISADVANTAGE | CONTENT OF COMPENSATION |
|---|---|---|
| ENTIRE IMAGE HUE COMPENSATION | • EXPOSURE OF 1ST/2ND COLORS WITH BOTH 100% DUTY | • EXPOSURE OF 1ST COLOR WITH 60% DUTY<br>• EXPOSURE OF 2ND COLOR WITH 100% DUTY |
| HUE COMPENSATION AT EDGE IMAGE | | |

Y : YELLOW MONO-COLOR
Y1 : 1ST COLOR YELLOW IN CASE OF COLOR REGISTRATION
M : MAGENTA MONO-COLOR
M1 : 1ST COLOR MAGENTA IN CASE OF COLOR REGISTRATION
M2 : 2ND COLOR MAGENTA IN CASE OF COLOR REGISTRATION
C : CYAN MONO-COLOR
C2 : 2ND COLOR CYAN IN CASE OF COLOR REGISTRATION
BK : BLACK MONO-COLOR

FIG. 11

| AN CODE | | | | PLACEMENT, SIZE | AN CODE | | | | PLACEMENT, SIZE |
|---|---|---|---|---|---|---|---|---|---|
| 4 | 3 | 2 | 1 | | 4 | 3 | 2 | 1 | |
| 0 | 0 | 0 | 0 | NO DOT | 1 | 0 | 0 | 0 | |
| 0 | 0 | 0 | 1 | CENTER 1/10 | 1 | 0 | 0 | 1 | LEFT 1/5 |
| 0 | 0 | 1 | 0 | CENTER 2/10 | 1 | 0 | 1 | 0 | LEFT 2/5 |
| 0 | 0 | 1 | 1 | CENTER 3/10 | 1 | 0 | 1 | 1 | LEFT 3/5 |
| 0 | 1 | 0 | 0 | CENTER 4/10 | 1 | 1 | 0 | 0 | LEFT 4/5 |
| 0 | 1 | 0 | 1 | CENTER 5/10 | 1 | 1 | 0 | 1 | FULL |
| 0 | 1 | 1 | 0 | CENTER 6/10 | 1 | 1 | 1 | 0 | FULL |
| 0 | 1 | 1 | 1 | CENTER 7/10 | 1 | 1 | 1 | 1 | FULL |
| 0 | 0 | 0 | 0 | CENTER 8/10 | 1 | 0 | 0 | 0 | FULL |
| 0 | 0 | 0 | 1 | CENTER 9/10 | 1 | 0 | 0 | 1 | RIGHT 1/5 |
| 0 | 0 | 1 | 0 | FULL | 1 | 0 | 1 | 0 | RIGHT 2/5 |
| 0 | 0 | 1 | 1 | FULL | 1 | 0 | 1 | 1 | RIGHT 3/5 |
| 0 | 1 | 0 | 0 | FULL | 1 | 1 | 0 | 0 | RIGHT 4/5 |
| 0 | 1 | 0 | 1 | FULL | 1 | 1 | 0 | 1 | FULL |
| 0 | 1 | 1 | 0 | EDGE A | 1 | 1 | 1 | 0 | FULL |
| 0 | 1 | 1 | 1 | EDGE B | 1 | 1 | 1 | 1 | FULL |

FIG. 12

| REGISTER NAME | SIGNIFICATION | | | | |
|---|---|---|---|---|---|
| REGISTER 0 | MONO COLOR Y.M.C SOLID | 8 | MONO COLOR Y.M.C BK EDGE A | 16 | RE-EXPOSURE |
| 1 | Y(Y+M) SOLID | 9 | Y(Y+M) EDGE A | 17 | SMOOTHING RIGHT 1/5 |
| 2 | Y(Y+C) SOLID | 10 | Y(Y+C) EDGE A | 18 | SMOOTHING RIGHT 2/5 |
| 3 | M(M+C) SOLID | 11 | M(M+C) EDGE A | 19 | SMOOTHING RIGHT 3/5 |
| 4 | M(Y+M) SOLID | 12 | M(Y+M) EDGE A | 20 | SMOOTHING RIGHT 4/5 |
| 5 | C(Y+C) SOLID | 13 | C(Y+C) EDGE A | 21 | SMOOTHING LEFT 1/5 |
| 6 | C(Y+M) SOLID | 14 | C(Y+M) EDGE A | 22 | SMOOTHING LEFT 2/5 |
| 7 | MONO COLOR BK SOLID | 15 | EDGE B | 23 | SMOOTHING LEFT 3/5 |
|  |  |  |  | 24 | SMOOTHING LEFT 4/5 |
|  |  |  |  | 25 | SMOOTHING CENTER 1/5 |
|  |  |  |  | 26 | SMOOTHING CENTER 2/5 |
|  |  |  |  | 27 | SMOOTHING CENTER 3/5 |
|  |  |  |  | 28 | SMOOTHING CENTER 4/5 |

PRIMARY SCANNING DIRECTION
SECONDARY SCANNING DIRECTION

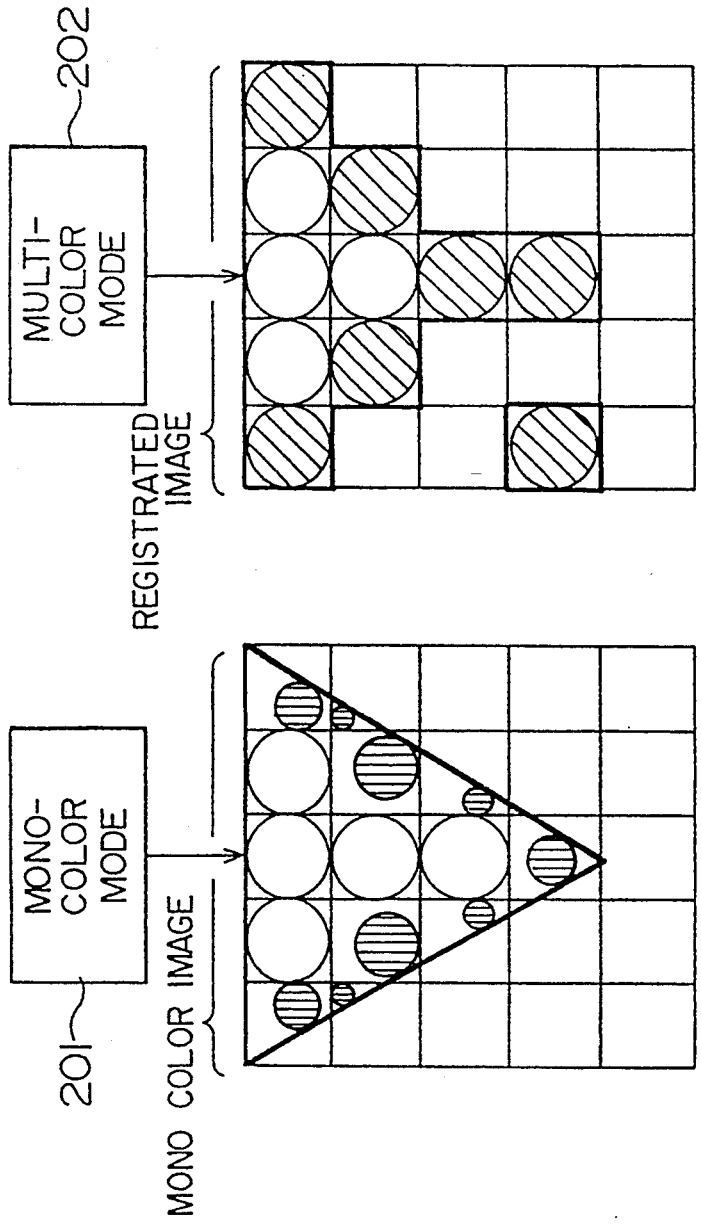

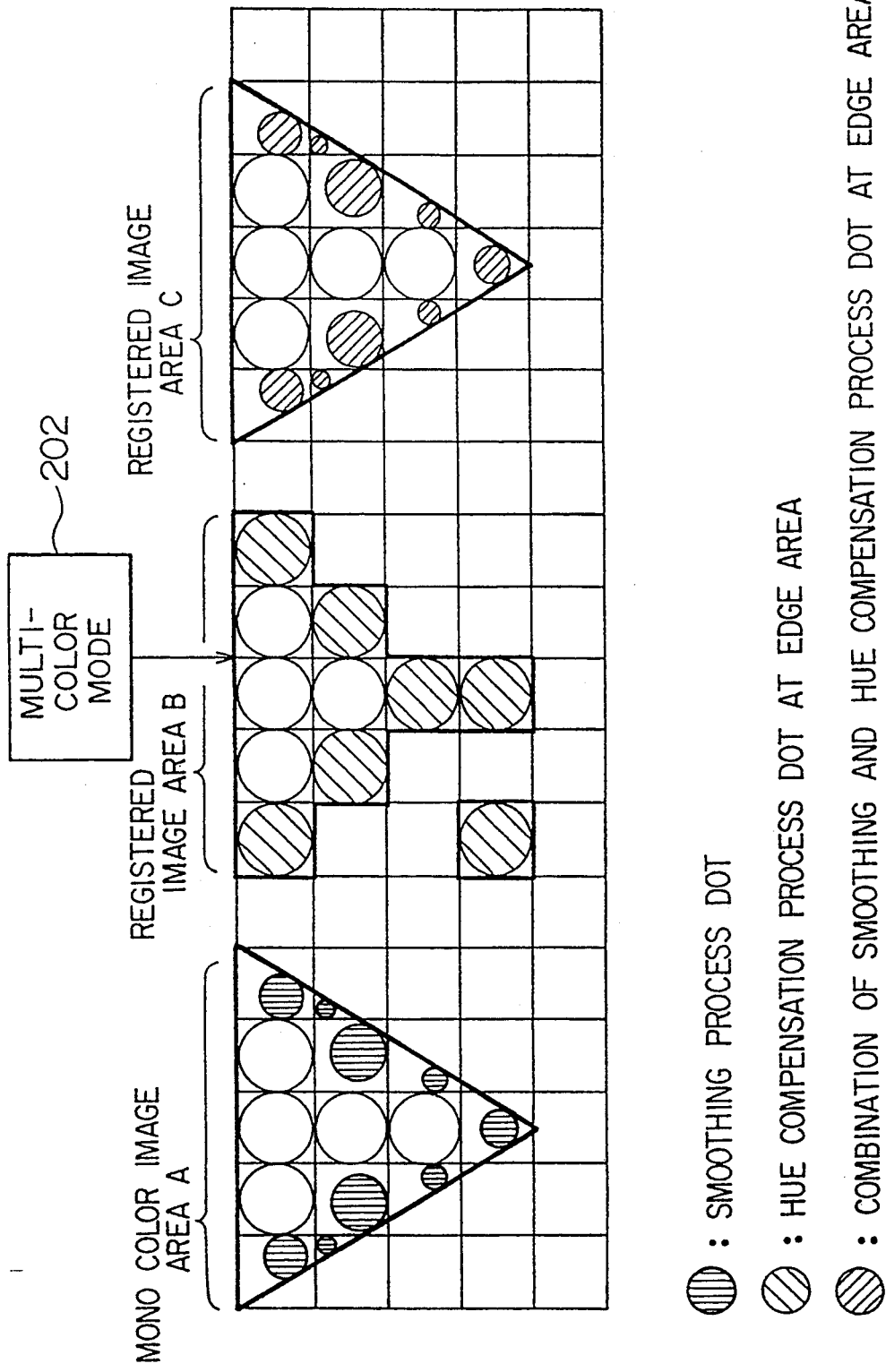

IMAGE FORMING APPARATUS WITH EXPOSURE, SIZE, AND POSITION CORRECTION FOR PIXELS

BACKGROUND OF THE INVENTION

The present invention relates to a color image forming apparatus, and more particularly relates to an electrostatic type color image forming apparatus such as a laser beam printer (LBP) and a digital color copier for which laser beams are utilized.

With the progress of computer graphics, there is a strong demand for very accurate and fine color images to be printed through highly advanced image processing. In the field of color copiers, clear color images are required in which the gradation is accurately reproduced and further accurate halftone images are obtained in accordance with the characteristics of the object to be copied.

In the field in which images of high quality are required, image formation is generally carried out in the following manner: a photoreceptor is scanned by a laser beam to form an electrostatic latent image; the electrostatic latent image is developed with color toners of Y (yellow), M (magenta), C (cyan) and BK (black), wherein the developed color toner images are put on each other; and the formed image is transferred onto a transfer paper by one operation. In order to satisfy the aforementioned various requirements, various systems are adopted for image processing.

As office automation apparatus have come into wide use, there is a demand for a printer of high image quality even in a small-scale office. In this case, improvements in the performance of apparatus are incompatible with the cost and size. Therefore, it is very difficult to satisfy all the requirements for the apparatus.

For example, in the case of image formation in which image writing processing is carried out at a standard setting, the cost can be reduced, however, the apparatus can not be controlled in accordance with the characteristics of various images, so that the following problems are caused: the hue of the entire image is insufficient; the hue is changed at the edge of an image; the contour of a sharp image or a diagonal line can not be reproduced accurately; the amount of moire is increased in the reproduction of a halftone dot image; and resolution is lacking when small characters of less than 5.5 point, so that the image quality is deteriorated. As a result of the foregoing, the aforementioned image forming system is not suited for obtaining images of high quality.

When it is attempted to improve image quality by means of image processing, various mechanisms are required in order to quickly change the processing conditions such as a highly developed signal processing circuit and control mechanism. As a result, the cost is raised.

In order to realize a multicolor printer of high image quality at low cost, the inventor investigated a technique in which the dot size and dot position in one pixel are dynamically changed with regard to the reference position. According to the result of the investigation conducted by the inventor, in the case of a monocolor image, the aforementioned dynamic processing (referred to as smoothing processing, hereinafter) to change the dot size and dot position is very effective to improve resolution and conduct smoothing on an image.

However, in the case of color image formation in which 2 color toner layers of Y, M, C and the like are put on each other, the change of dot size and dot position obstructs the alignment of the first and second color images. Therefore, the quality of the obtained color image is lower than that of a mono color image.

In order to realize a multicolor printer of high image quality at low cost, the inventor made an investigation. As a result of the investigation, it is apparent that, compared with monocolor image formation, color image formation has a problem of color alignment, so that it is difficult to improve image quality.

SUMMARY OF THE INVENTION

The first object of the present invention is to provide a simplified compact color image forming apparatus of low cost by which color image quality can be improved.

The second object of the present invention is to provide a color image forming apparatus in which the quality of a multicolor image can be improved when the dot size and dot position are dynamically changed in one pixel in the case where the color image is formed by superimposing toner images of different colors.

The third object of the present invention is to improve the quality of both a monocolor and color image.

A typical structure of the image forming apparatus of the present invention will be described as follows.

(1) In the case where a dot of one pixel is written on a photoreceptor with a laser beam, the center of the laser beam can be biased with regard to the reference position, and the diameter of the laser beam can be changed at that time. (The aforementioned processing is very effective to conduct smoothing on an image. Accordingly, the aforementioned processing in which the dot writing position and dot size are dynamically changed, will be referred to as smoothing processing, the detail of which is shown in FIG. 16.)

A semiconductor diode is used for the light source for writing, and this laser diode is driven by a pulse-width signal that has been pulse-width-modulated. (In a usual writing operation, a position in one pixel where a pulse-width signal is generated, is specified, and that position is used as a reference, and the pulse width is controlled and laser beam energy to be emitted is controlled.)

The aforementioned smoothing processing is carried out when the generation timing of a pulse-width signal and the pulse width are controlled by a correction signal that is different from the reference signal (shown in (a) to (c) of FIG. 16).

In this case, the writing position can be changed only in the primary scanning direction of the beam. However, when it is necessary to change the writing position in the auxiliary scanning direction, the angle of a reflection surface of a polygonal mirror may be changed or an optical path composed of a lens may be changed. ((d) in FIG. 16)

(2) An image to which smoothing processing is especially effective is previously determined, and at least that portion is subjected to smoothing processing. Smoothing processing is effective in the following portions: an edge portion (that is, the edge of an image including an isolated dot), sharp image, diagonal line, halftone image, variable density image, and small character (characters of not more than 5.5 point). Especially, the edge portion of a monocolor image can be easily recognized, and great effect can be provided when the image is subjected to smoothing processing.

(3) In addition to smoothing processing, hue correction processing is carried out. These two kinds of processing are appropriately used.

When colors are superimposed, the hue correction processing is carried out. In the hue correction processing, a ratio of each toner amount is controlled to a predetermined value so that a desired hue can be realized. Usually, the superimposing operation is carried out when a latent image of the first color is formed. This hue correction is essentially different from smoothing processing by which the recording position and dot size are changed, wherein consideration is given to the configuration of an image. However, the hue correction can be realized by a means in which the light emitting period of a laser diode and timing (that is, the preparation for a pulse-width signal) are controlled in the same manner as smoothing processing.

In the case where the two correction processing operations compete with each other, priority is given to smoothing processing, and a dot that is not directed to smoothing processing is subjected to hue correction processing. The aforementioned two processing operations are appropriately used by comparing an input image signal with a template pattern (essentially composed of a plurality of high speed comparators). When the image signal coincides with the condition of the pattern, its dot is subjected to smoothing processing, and hue correction is neglected. When the image signal does not coincide with a predetermined pattern and smoothing processing is not conducted, it is judged whether or not the dot is formed when toner images of different colors are superimposed. In the case where colors are superimposed, color correction is carried out with regard to the first color.

These circumstances are illustrated in FIG. 14(c). In FIGS. 14(a) to 14(c), a case in which a red (R=Y+M) diagonal line is printed, is taken for an example in order to explain the characteristics of dot formation of the present invention. FIG. 14(a) shows a conventional dot forming method that is used for comparison. In FIG. 14(c), hatched dots are smoothing processing dots. In these dots, the amount of Y=M, so that hue correction is neglected. On the other hand, hue correction is conducted on the dots that have not been subjected to smoothing processing. It is discriminated whether or not the dot is an isolated one, and also it is discriminated whether or not the dot is an edge one. When it has been discriminated that the dot is an isolated one or edge one, the image exposure of the first color is intensified in order to increase the amount of toner adhesion as compared with a dot that has not been discriminated to be an isolated or edge dot.

(4) In the case of color image formation in which different color toners are superimposed (for example, in the case where the first color toner and the second color toner are superimposed), when the first color toner is subjected to smoothing processing, the second color toner is also subjected to smoothing processing.

This processing is carried out in the following manner: first, the dot to be subjected to smoothing processing is selected using a template; superimposition of colors is checked with respect to the dot from the information of the frame memory; and calculation is further conducted on the dot so that the dot diameter and dot placement can be finally determined.

FIG. 14(b) shows an example of red (R=Y+M) diagonal line printing to which this system is applied. Dots to be subjected to smoothing processing in FIG. 14(c), are also subjected to hue correction in which the first color Y is a little weakened in FIG. 14(b). In this case, the grade of hue correction is appropriately adjusted in accordance with the dot size.

(5) As shown in FIG. 5, hue correction includes hue correction for the entire image (shown on the left of FIG. 5) and hue correction for the edge portion (shown on the right of FIG. 5). As shown on the left of FIG. 5, hue correction for the entire image is carried out in the following manner: since the power of exposure light of the second color to reach the photoreceptor is reduced by the first color toner, the amount of the first color toner is a little reduced in order to prevent the reduction of the power of exposure of the second color, so that the ratio of each color can be made most suitable.

As shown on the right of FIG. 5, hue correction for the edge portion is carried out in the following manner: when the edge position of the first color and that of the second color do not agree with each other due to the difference between the pulse width of the first color and that of the second color, the first color does not overlap the second color from a microscopic viewpoint, so that hue of the edge portion is changed; and in order to prevent the change of hue of the edge portion, the pulse width is adjusted and the edge position of each color is aligned.

With reference to FIG. 6, the actions of the apparatus will be explained with regard to the aforementioned structures (1) to (5).

(a) According to the investigation carried out by the inventor, smoothing processing (changing processing of the dot placement and dot size in one pixel) can provide the following effects.

(i) Resolution can be visibly improved. For example, small characters such as characters of 5 point can be reproduced at high resolution. Further, the edge of a character can be clearly reproduced as if it were emphasized.

(ii) When smoothing processing is applied to a halftone dot image, each original halftone dot can be reproduced. As a result, the obtained image is not affected by moire.

(iii) Smoothing processing does not affect a photographic image, the density change of which is gentle.

(iv) The adhesion amount and adhesion position of toner can be controlled by smoothing processing, so that hue and image roughness can be controlled, and image quality can be improved.

That is, smoothing processing is effective to obtain a plurality of effects through a simple electrical operation such as an operation controlling the timing and period of a pulse-width-modulation signal.

(b) Whether smoothing processing is to be carried out or not is determined when the dot is checked with a template pattern. In this case, when the image type to be processed is restricted, judgment can be easily performed. The image types to be processed are as follows: edge portions (including an isolated dot), sharp figures, diagonal lines, halftone dot images, variable density images, small characters (characters of not more than 5.5 point). Especially, an edge portion can be easily recognized in the case of monocolor, and great smoothing effects can be provided in the edge portion, so that priority is given thereto when smoothing processing is carried out.

(c) When hue correction is conducted in addition to smoothing processing so that hue correction and smoothing processing are appropriately used, apparent resolution can be improved, and images can be sharply reproduced, and further color reproduction can be improved. In this case, the procedure is as follows: first, dots are checked with the template so that the necessity of smoothing processing is judged; when necessary, priority is given to smoothing processing; and calculation for hue correction is made with regard to the dots having color overlap that are not subjected to smoothing processing. The aforementioned system is advantageous in that hardware and algorithm used in the software for processing is simple.

Both correcting operations can be realized by the same electrical operation of control of timing and period of the pulse-width-modulation signal. Therefore, the structure of the optical section is not complicated. Information about image patterns and colors necessary when correcting operations are appropriately used, is used for both smoothing processing and hue correction. Accordingly, particular information collection steps are not necessary when one of the correcting operations is carried out.

(d) In the case where the dots of the first color image are subjected to smoothing processing, the dots of the second color and after that are also subjected to smoothing processing. As a result of the foregoing, the dots to be superimposed can be aligned, so that a desired color can be reproduced while the smoothing effects described in item (1) are provided. Also, when hue correction is carried out, a desired hue can be realized. According to the aforementioned system, both perfect hue correction and image smoothing can be realized.

(e) When hue correction includes both entire image correction and edge portion correction, the color reproduction function can be strengthened.

The aforementioned is illustrated in FIG. 6. That is, the correction mode of the image forming apparatus of the present invention includes: mode A in which only hue correction is carried out; mode B in which smoothing processing is conducted only on monocolor dots, and hue correction is carried out on other dots; mode C in which all dots (including multicolor dots) to be processed are subjected to smoothing processing, and other dots are subjected to hue correction; Mode D in which all dots (including multicolor dots) given a processing command are subjected to smoothing processing, all dots on which colors are superimposed, including the aforementioned dots given the processing command, are subjected to hue correction.

An image in which color superimposition is conducted will be explained as follows. Results of processing according to mode A and mode B are shown in FIG. 14(a). Results of processing according to mode C are shown in FIG. 14(b), and results of processing according to mode D are shown in FIG. 14(c).

As shown on the right of FIG. 6, in the case of mode C, both the smoothing effects or edge emphasizing effects obtained by smoothing processing, and appropriate color reproduction obtained by hue correction can be provided. In the case of mode D, perfect hue can be realized with regard to smoothing dots.

In FIG. 6, edge A and edge B are appropriately used in the process of hue correction. Edge A is defined as an edge subjected to hue correction, and edge B is defined as a boundary of the image of the second color that is superimposed on the background of the first color image. (It is difficult to adhere toner onto the boundary of the second color image, so that correction is carried out. Therefore, the second color is strongly exposed to light for the correction. Edge B is used for the aforementioned object.)

(6) Hue correction processing is added to smoothing processing. Further, the contents of the hue correction processing are changed in accordance with the level of dot size of smoothing processing so that the first and second colors can be aligned. Accordingly, the same hue can be realized on each level of smoothing processing.

(7) Specifically, edge hue correction processing is carried out in the following manner: in the process of smoothing processing, isolated and edge dots are concurrently discriminated; when the isolated and edge dots are subjected to smoothing processing, as the dot diameter is reduced due to the smoothing processing, the toner adhesion ratio of the first and second color toners is adjusted so that the adhesion amount of the first color toner can be increased with regard to the adhesion amount of the second color toner.

With reference to FIG. 15, the actions with respect to the structures (6) and (7) will be explained as follows.

As illustrated in column (4) of FIG. 15, smoothing processing is carried out for the purpose of realizing the sharp contour of a sharp image such as a diagonal line. The dots forming an isolated dot or an edge (the contour of a figure) are essentially subjected to smoothing processing. The isolated dot and edge dot are different from a solid dot, a group of which forms a solid image. Therefore, when an electrostatic latent image is formed, light beams do not continue, so that the interaction of light beams does not work, and when the pulse width of a drive pulse emitted from the light source (semiconductor laser) is reduced, the average light intensity of the beams is sharply lowered. That is, since the isolated dot and edge dot are formed from a simple light beam, the changing rate of light intensity with regard to the pulse width is high.

When the pulse width of a pulse signal to drive the semiconductor laser is successively changed in order to dynamically change the dot sizes of the first and second colors, the light intensity of light beams is changed nonlinearly according to the size of the dot, so that the dot of the first color and that of the second color are not aligned.

As shown on the graph in column (4) of FIG. 15, when the duty ratio of the pulse width signal is changed from 0 to Full, the dot size of an isolated dot, that is, the size of the light beam is sharply changed in the region where the duty ratio is low as illustrated by a solid line in the graph, and in the region where the duty ratio is high, the dot size of the isolated dot is changed gently, so that the characteristics are nonlinear. Therefore, when the duty ratios of the first and second colors are uniformly fixed (for example, 1:2), the light amount is extremely reduced due to the reduction of the duty ratio of the first color when the dot size is reduced. Accordingly, the toner adhesion amount of the first color is substantially reduced, so that the hue is changed as compared with a case in which the dot size is large. That is, when the duty ratios of the first and second colors are equal, the color tone is delicately changed according to the size in the case where the size of the multicolor dot is dynamically controlled. Accordingly, the hue becomes inaccurate, and it is difficult to form a sharp color image of accurate color tone.

Therefore, according to the present invention, in the case where an isolated dot and edge dot are subjected to smoothing processing, the duty ratio of the first color and that of the second color are not fixed, but they are changed in accordance with the dot size so that the same color tone can be realized with regard to the first and second colors in -any size.

Specifically, the operation is carried out as follows. As the dot size becomes small, there is a tendency that the light amount of the first color is lowered. Therefore, in order to correct the reduction of the light amount of the first color, the first color is strongly exposed. That is, as the dot size becomes small, the exposure duty ratio of the first color is increased with regard to the second color. For example, as shown on the table in column (4) of FIG. 15, in the case where the dot size of an edge (isolated) dot is classified into 5 stages of (a), (b), (c), (d) and Full in order of the size of the dot, the duty ratios of the first and second colors become as follows: "1", "0.75", "0.67", "0.62" and "0.5". The circumstances of exposure of the first and second colors conducted under the aforementioned duty ratios are shown on the upper left side of column (4). When they are superimposed, a sharp image of accurate color tone can be formed (illustrated in the upper center of column (4)).

Countermeasures accompanied by the change of the dot size are explained above with regard to the edge (isolated) dot. Concerning a solid dot (a dot that forms a solid image), the lower slope portions of each light beam for dot formation overlap each other, so that uniform light intensity distribution is formed. Accordingly, even when the duty ratio of each dot is changed (especially when the duty ratio of each dot is reduced), the light amount is not sharply lowered. Therefore, it is not necessary to conduct strong exposure of the first color. Accordingly, as shown in columns (2) and (3) of FIG. 15, when comparison is made with regard to the dot of full size, the duty ratio of the first color of a solid dot can be made more close to a theoretical value. That is, in the case of a solid dot, the duty ratios of the first and second colors are 30:100, so that the duty ratio of the first color is low compared with that (50:100) of an isolated dot.

Even when the theoretical values are the same with regard to the first and second colors as shown in column (1), the duty ratio of the first color is lower than that of the second color with regard to a solid dot and an isolated dot. The reason is as follows: the first color toner image obstructs the exposure beam of the second color, so that the hue does not agree with the theoretical values; and therefore the exposure intensity of the first color is reduced (this operation is referred to as hue correction).

The image forming apparatus (such as a printer) that conducts dynamic hue correction in the case of smoothing processing of an edge (isolated) dot, comprises: a toner adhesion amount adjusting means that adjusts the toner adhesion amount of the first color and that of the second color; a smoothing processing means that dynamically controls the toner dot diameter in one pixel so that apparent resolution can be improved; and an edge discrimination means that discriminates whether the dot to be formed is an isolated dot or an edge dot.

The edge discrimination means detects according to a dot condition signal in real time in the printing process that the dot is an edge dot (isolated dot). In this case, the dot condition signal is defined as follows: for example, image information is bit-map-developed, and the bit-map-data is compared with a template, so that it is discriminated whether each dot is a dot to be subjected to smoothing processing or a dot to form the edge of a figure, and the result of the discrimination is shown by a plurality of bit signals.

The toner adhesion amount adjusting means and smoothing processing means carry out processing of a different concept. The aforementioned processing can be realized when the generation of a PWM signal is controlled that drives a writing light source (semiconductor laser) for electrostatic latent image formation. That is, the control of toner adhesion amount can be realized when the pulse width is controlled so that the light intensity is adjusted. Smoothing processing (a dynamic change of dot placement and dot size in one pixel) can be realized when the generation timing of a pulse width signal and the pulse width are controlled. That is, in a normal writing operation, the generating position of a pulse width signal is specified in one pixel, and the pulse width is controlled in accordance with the position so that irradiating energy is controlled. However, in the case of smoothing processing, the generation timing of a pulse width signal and the pulse width are controlled by a correction signal different from the standard. The control conducted by a PWM signal is quick and accurate, and further the structure is simplified. Accordingly, the cost of the image forming apparatus can be reduced.

(8) In the monocolor mode, a technique in which the dot size and dot placement are changed in one pixel (this technique is referred to as smoothing processing) is preferentially carried out, so that the resolution is improved and images are subjected to smoothing processing. On the other hand, in the color mode, color dots are formed when the first and second colors are superimposed, and edge hue correction in which the first color is exposed more strongly than the reference is preferentially conducted on an isolated dot or an edge dot.

(9) When the color mode is selected, one printing operation is carried out in the following manner: a monocolor image region and a color region in which colors are superimposed are discriminated; in the color image region, an isolated dot or edge dot and a solid dot are discriminated; smoothing processing is preferentially conducted in the monocolor image region; and edge hue correction is preferentially conducted in the color image region.

The actions of the apparatus will be explained with regard to the structures of the aforementioned items (8) and (9).

(a) According to the investigation made by the inventors, in the case of monocolor, dynamic dot size and dot placement changing processing (smoothing processing) reproduces the sharp contours of a diagonal line and a thin line, so that apparent resolution can be improved and the image is subjected to smoothing processing. However, in the case where 2 color toner layers among Y, M and C are superimposed so that a color image is formed, the change of the dot size and dot placement obstructs the alignment of the first and second colors. Therefore, it is difficult to conduct such a changing processing on the superimposed image. Accordingly, smoothing processing is carried out only in the monocolor mode, and in the case of the color mode, edge hue correction is carried out instead of smoothing processing to avoid the disturbance of color tone in the edge (isolated) portion, so that a sharp color image contour can be reproduced. In the manner described above, the quality of both monocolor images and color images can be improved.

(b) In one image in the color mode, a monocolor image and color image are discriminated, and smoothing processing is preferentially conducted on the monocolor image, and edge hue correction is preferentially conducted on the color image. Especially when a sharp contour is required for the color image, the first and second colors are respectively subjected to the smoothing processing.

BRIEF DESCRIPTION OF THE DRAWINGS

FIG. 5 is a view showing the contents of hue correction adopted for the apparatus shown in FIG. 4;

FIG. 11 is a view showing the contents of information AN expressing dot printing positions, dot sizes and edges in FIG. 7 (FIG. 4);

FIG. 12 is a view showing an example of stored data of the register;

FIG. 14(a) shows a conventional dot formation method to be used for comparison, FIG. 14(b) shows a dot formation method in which smoothing processing and hue correction processing are appropriately used, and FIG. 14(c) shows a dot formation method for conducting hue correction on all dots on which colors are superimposed including smoothing processing dots;

FIGS. 18(a) and 18(b) are views respectively explaining an example of the processing that characterizes the present invention; and FIG. 19 is a view explaining another example of the processing that characterizes the present invention.

DETAILED DESCRIPTION OF THE PREFERRED EMBODIMENTS

Figure 2:
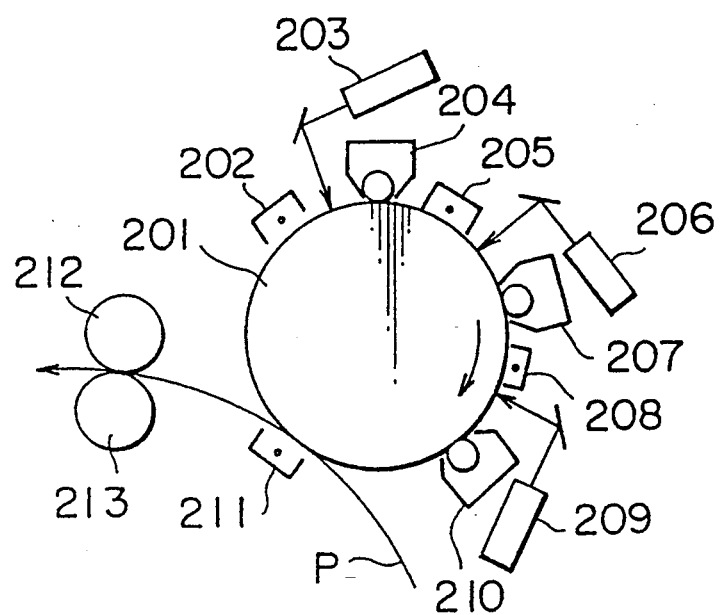
FIG. 2 is a view showing another example to which the image forming means of the present invention is applied.

FIG. 2 shows an example to which the color image forming process of the present invention is applied. In the example, the first image forming means composed of a charging electrode 202, an exposure means 203, and a developing section 204, the second image forming means composed of a charging electrode 205, an exposure means 206, and a developing section 207, and the third image forming means composed of a charging electrode 208, an exposure means 209, and a developing section 210 are provided respectively around the photoreceptor drum 201 which is an image carrier. A color toner of yellow is loaded in the developing section 204 of the first image forming means, a color toner of magenta is loaded in the developing section 207 of the second image forming means, and a color toner of cyan is loaded in the developing section 210 of the third image forming means. After the electric charge is given to the photoreceptor drum 201 by the charging electrode 202, the exposure control by the duty ratio is conducted by the exposure means 203 in the same manner as the above-described image forming process, and the color toner of yellow is developed by the developing section 204. At the next stage, charging is conducted on the photoreceptor drum 201 and the color toner of yellow, and an electric charge elimination control by the pulse width control is conducted by the exposure means 209, and the color toner of magenta is developed by the developing section 207. The color toner of cyan of the third image forming means is then superimposed and developed. This method is the method by which image formation is conducted when the photoreceptor drum 201 is rotated by one turn, and the color image is transferred onto a recording sheet P by a transfer electrode 211, and the color toner which is conveyed between a thermal fixing roller 212 and a pressure contact roller 213, is fixed onto the recording sheet P.

Figure 3:
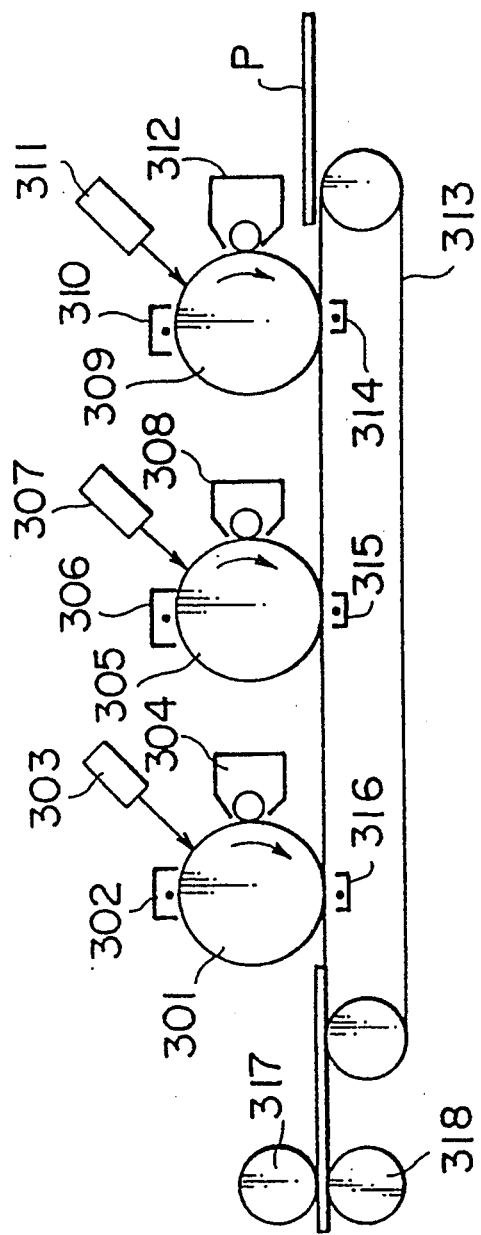
FIG. 3 is a view showing further another example to which the image forming means of the present invention is applied.
Figure 10:
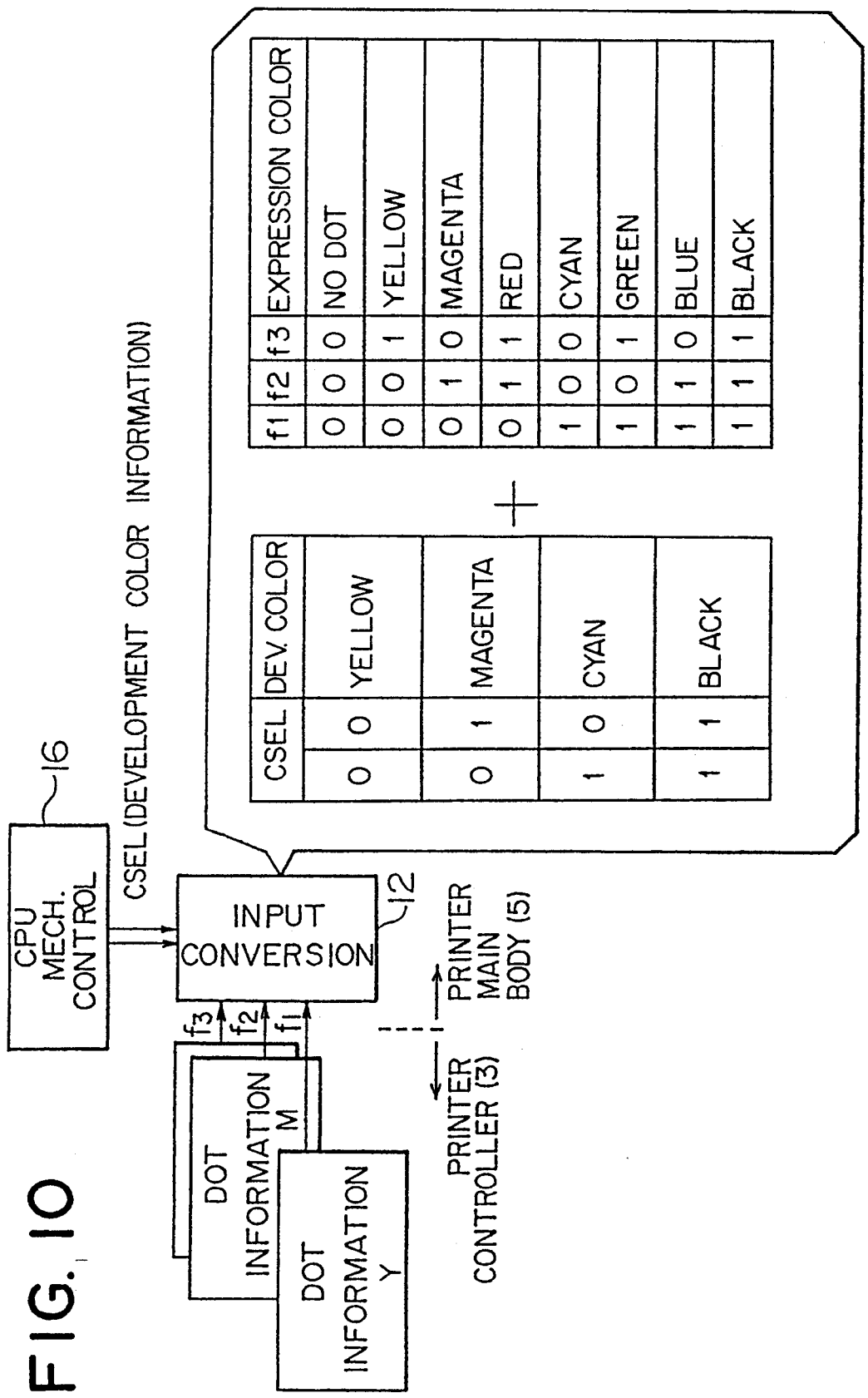
FIG. 10 is a view showing the input mechanism of video data (dot data) from the printer controller 3 to the printer body 5 in the apparatus shown in FIG. 7 (FIG. 4)

Next, the example shown in FIG. 3 is an image forming apparatus to which the color image forming process of the present invention is applied in the same manner as the foregoing. In the example, the first image forming means in which a charging electrode 310, an exposure means 311 and a developing section 312 are provided around a photoreceptor drum 309, the second image forming means in which a charging electrode 306, an exposure means 307 and a developing section 308 are provided around a photoreceptor drum 305, and the third image forming means in which a charging electrode 302, an exposure means 303, and a developing section 304 are provided around a photoreceptor drum 301, are provided, and a recording sheet conveyance belt 313 which is contacted in common with the photoreceptor drum 309 of the first image forming means, the photoreceptor drum 305 of the second image forming means, and the photoreceptor drum 301 of the third image forming means, is provided, and further, transfer electrodes 314, 315, and 316 are provided through the recording sheet conveyance belt in positions opposed to the photoreceptor drums 309, 305, 301, and a yellow developing unit is provided in the developing section 312, a magenta developing unit is provided in the developing section 308, and a cyan color toner developing unit is provided in the developing section 304. When the color image forming process of the present invention is applied to the image forming apparatus, the photoreceptor drum 309, to which the electric charge is given by the charging electrode 310, is exposed by the exposure means 311 by which exposure control by the duty ratio is conducted, a yellow color toner is developed by the developing unit 312, and the recording sheet P is conveyed by the recording sheet conveyance belt 313 when development has been completed, and the yellow image is transferred onto the recording sheet P by the transfer electrode 314. Next, the photoreceptor drum 305 to which the electric charge is given by the charging electrode, is exposed by the exposure means 307 by which the exposure control by the duty ratio is conducted so that the second color toner is superimposed on the recording sheet P, and after that, the color toner of magenta is developed by the developing unit 308, and the color toner of magenta which is formed on the photoreceptor drum is transferred by the transfer electrode 315 so that it is superimposed on the color toner of yellow which has been formed on the recording sheet P. As described above, the image forming process of the present invention is used for two color toners as shown in FIGS. 10 and 11, and is structured in the manner that the amount of the color toner is equally transferred when two colors are superimposed. Further, in the foregoing example, only the case of three primary colors is explained, however, of course, a developing unit using black toner may be added to this system.

Although not shown in the example, the following method may be adopted in which a three color or four color toner image is formed on the photoreceptor drum, and the color image is transferred onto the recording sheet through a transfer drum.

Figure 1:
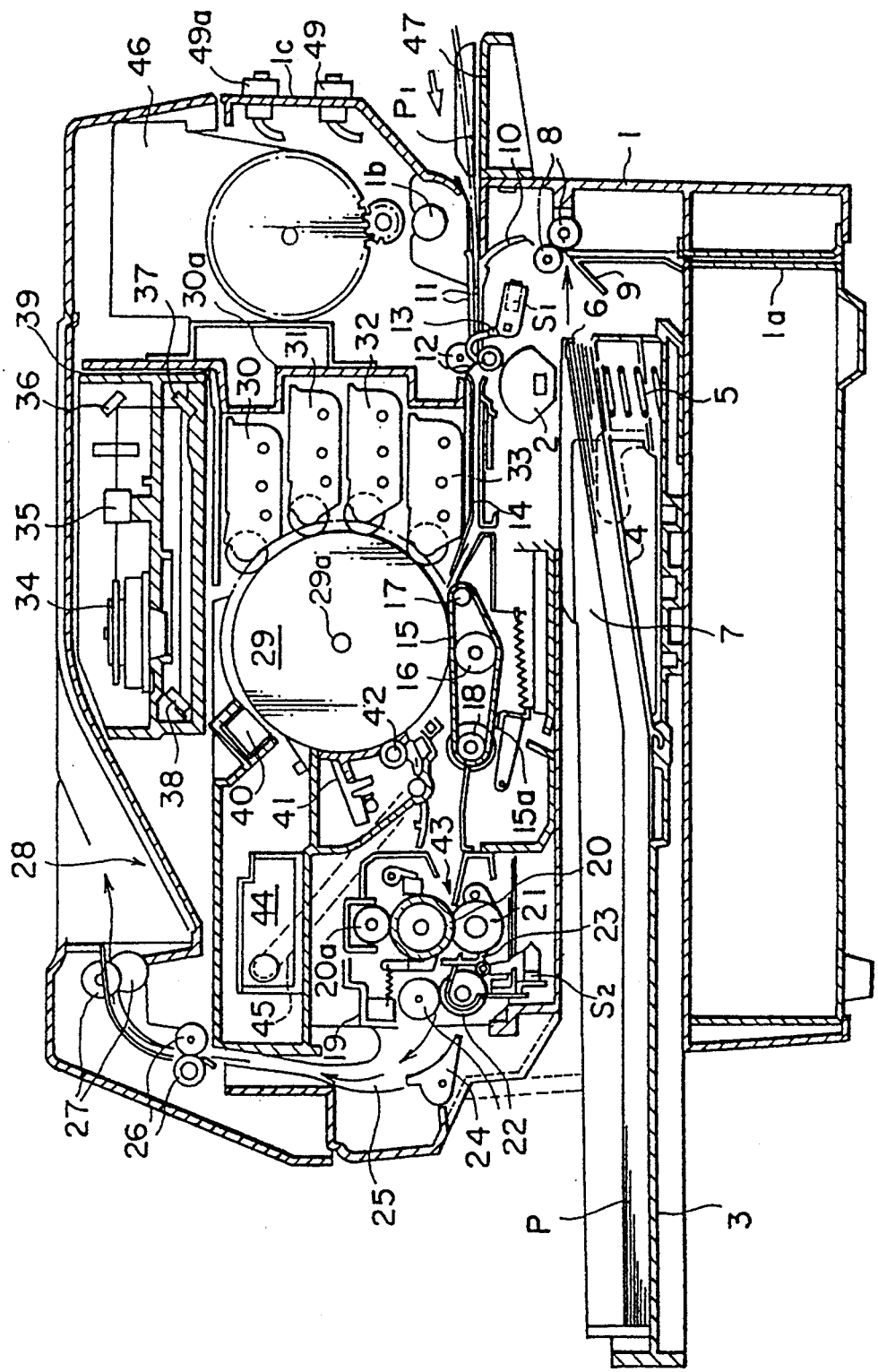
FIG. 1 is a longitudinal sectional view of an image forming apparatus to which the image forming means of the present invention is applied.

FIG. 1 shows another example to which the color image forming process of the present invention is applied.

In FIG. 1, numeral 1 is a lower frame of the image forming apparatus. A half-moon-shaped sheet feed roller 2 by which a recording sheet P, which is a transfer body, is fed is provided in the lower frame, and a sheet feed cassette 3 in which a plurality of recording sheets P are loaded is detachably provided in the lower frame 1. A push-up plate 4 which is pushed up by a spring 5 is provided in the sheet feed cassette 3, the recording sheets P are loaded on the plate 4, and a separation claw 6, which is rotatably provided to a portion of the sheet feed cassette 3, is engaged with the uppermost portion of tips of the recording sheets P. Numeral 7 is a guide plate by which both sides of the recording sheet P are guided, and which is adjustably provided depending on the size of the recording sheet. The aforementioned structures are provided in the sheet feed cassette 3. Numeral 8 is a conveyance roller for the recording sheet P which is provided in the lower frame 1, and provided between the guide plate 9, by which the leading edge of the recording sheet P fed by the sheet feed roller 2 is guided, and a reversal guide plate 10.

Numeral 11 is a guide plate which guides the recording sheet P to a registration roller 12 after the recording sheet P is reversely fed. Numeral 13 is a swing member by which a sensor $S_1$, which is used for detecting the recording sheet P at the position of the registration roller 12, is turned ON and OFF. Numeral 14 is a guide plate by which the recording sheet P is guided in the direction of a transfer belt 15 after the recording sheet P has passed the registration roller 12, and the transfer belt 15 is stretched around a transfer roller 16, a roller 17, and a drive roller 18. Numeral 15a is a cleaning means by which the surface of the transfer belt 15 is cleaned. Numeral 19 is a fixing unit by which an image, which has been transferred onto the recording sheet P, is fixed, and which is composed of a thermal fixing roller 20 and a pressure contact roller 21, and the thermal fixing roller 20 is contacted with a cleaning roller 20a with pressure, and is cleaned when it is rotated. Numeral 22 is a sheet delivery roller by which the recording sheet P is delivered from the fixing unit 19, and a swing member 23, by which a sensor $S_2$ is turned ON and OFF so that the delivery of the recording sheet P can be ensured, is actuated by the recording sheet P when it is delivered. A delivery sheet tray 28 is structured so that the recording sheet P is delivered on the delivery sheet tray 28 which is provided on almost the entire surface of the upper portion of an upper frame 1c, by a recording sheet guide member 24, a guide path 25 which is formed on the upper frame 1c, and conveyance rollers 26 and 27. An image carrier 29 for image formation, (which will be called a photoreceptor drum 29, hereinafter), is provided to an almost central portion of the upper frame 1c, and a developing unit frame 30a is provided in the manner that: four pairs of developing units 30, 31, 32, and 33 can be located from the above along the surface of the photoreceptor drum 29. Numeral 34 is a polygonal mirror by which laser beams irradiated from a laser beam source (not shown in the drawing) are passed through an fθ lens 35, and the laser beams are reflected by reflection mirrors 36, 37, and 38, to expose the photoreceptor drum 29. Numeral 39 is an optical system frame into which an optical system composed of the polygonal mirror 34, and reflection mirrors 36, 37, and 38, are integrally assembled, and which is assembled into the uppermost portion of the upper frame 1c.

Numeral 40 is a charging electrode by which the entire surface of the photoreceptor drum 29 is charged, and is provided in a portion of the upper frame 1c. Numeral 41 is a cleaning blade by which residual developers, which adhere to the surface of the photoreceptor drum 29, are cleaned after the image has been transferred onto the recording sheet P from the photoreceptor drum 29. A conveyance unit 43, by which the scraped developer is received and delivered to the outside of a cleaning unit, is provided, and a developer receiving member 42, by which the developer scraped off by the cleaning blade is effectively sent to the conveyance unit 43, is provided to the lower portion of the cleaning blade 41. The developer conveyed to the outside of the cleaning unit by the conveyance unit 43, is conveyed by a conveyer 45 to a container 44, which is structured so that a proper amount of the developer can be accumulated in the container, and the container can be disposed of when it is detached from the apparatus. Numeral 46 are developer containers by which developers are supplied to the developing units 30, 31, 32, and 33, and four pairs of the developer containers are provided in parallel in the apparatus although only one pair of the developer containers is shown in the drawing. The developer containers are structured in the manner that color developers of, for example, cyan, magenta, yellow, and black are supplied respectively to the developing units 30, 31, 32, and 33 so that color development can be conducted. Numeral 47 is a hand feeding unit from which the recording sheet P is supplied by manual feeding. The lower frame 1 and the upper frame 1c are assembled around a support shaft 1b so that a conveyance path of the recording sheet P can be opened. When recording sheet P is not properly conveyed, and the recording sheet P does not arrive at least at the fixing unit 19, the upper frame 1c can be opened around the support shaft 1b, so that the recording sheet can be removed. A guide plate 1a is provided by which the recording sheet P located in the lower frame 1 can be supplied from another sheet feed unit (not shown in the drawing).

The photoreceptor drum 29 is provided to a frame 41a to which the cleaning blade 41 is provided, through a support shaft 29a, which is supported by the upper frame 1c.

In the foregoing image forming apparatus, when an image signal by which a laser beam source 35 is modulated, is outputted from the host unit through the printer controller, the surface of the photoreceptor drum 29 which is charged by the charging electrode 40 is imagewise exposed.

Next, yellow toner is developed by the developing unit 30 as the first color, and charged again by the charging electrode 40, and after the second imagewise exposure has been conducted by the laser beam source, magenta toner is superimposed on the yellow toner and developed by the developing unit 31.

In the same manner as described above, when cyan toner as the third color, and black toner as the fourth color are superimposed successively on the aforementioned color toners, charged again, imagewise exposed, and developed, the color toner image having four colors is formed on the surface of the photoreceptor drum 29.

A gap between the photoreceptor and the development agent carrier (which will be called DSD, hereinafter) is about 0.2 mm to 0.8 mm, wherein a two-component developer composed of a mixture of a carrier which is made of magnetic particles, and toner which is made of non-magnetic particles, is used as a developer.

Weight average particle size of carrier is 15 to 80 $\mu$m in this example, and preferably 20 to 50 $\mu$m, and that of toner is 5 to 20 $\mu$m. Thickness of a developer layer is regulated to a predetermined value on the developer carrier by a layer thickness regulating means. The layer thickness is preferably slightly thinner than the gap between the photoreceptor and the developer carrier. The developer carrier consists of a conductor or a conductor on the surface of which an insulation layer is provided, and a D.C. or an A.C. electric field is given between the carrier and the photoreceptor as a developing bias.

As described above, charging, imagewise exposing, and developing are conducted successively on the surface of the rotating photoreceptor drum 29, color toners are superimposed on each other, a toner image, which is exactly formed into a color image by exposure control, is transferred onto the recording sheet P by the transfer belt 15, and the toner image is fixed on the recording sheet P by the fixing unit 19.

With reference to the attached drawings, an example of the present invention will be explained as follows.

EXAMPLE

Figure 4:
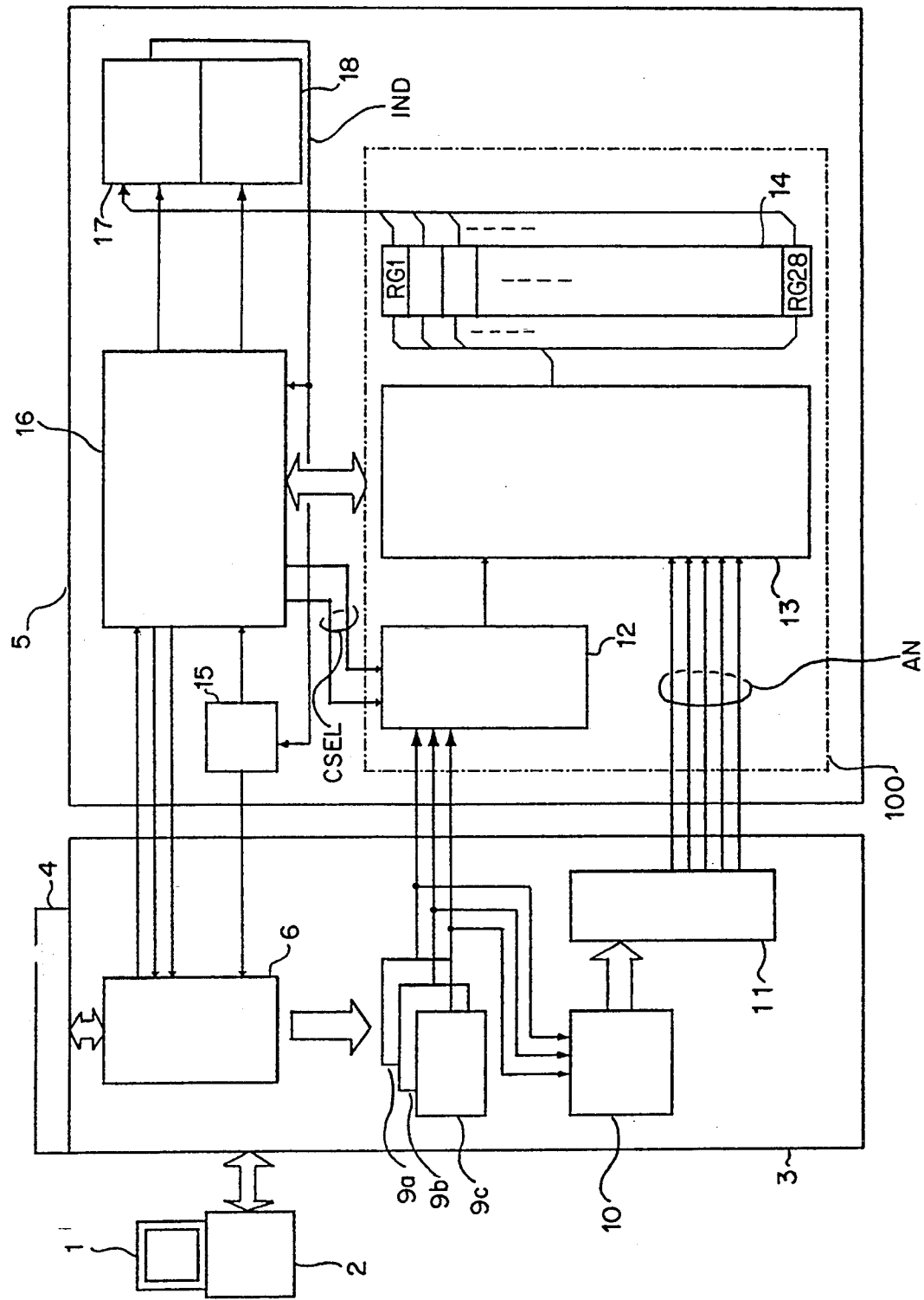
FIG. 4 is a view showing the structure of the example of the image forming apparatus of the present invention.

FIG. 4 is a view showing the entire structure of an example of the image forming apparatus of the present invention. In this case, a 7 color multicolor page printer is taken for an example.

The apparatus of this example comprises a printer controller 3 (including an operation board 4) and a printer body 5.

The printer controller 3 decodes image information (mainly composed of page description language), and develops it into bit-map-data. The printer controller 3 sends the data to a video interface 100 in the printer body 5, and further the printer controller 3 recognizes the preparation state of the printer body 5 and the host computer 2, and sends a command to the host 2, operation board 4 and video interface 100. Usually, the printer controller is integrally incorporated into the main body. The printer controller 3 comprises a high speed CPU6, plain memory 9 (9a to 9c) storing a page of data that has been bit-map-developed, RAM10, and dot condition discrimination circuit 11. The plain memories 9a, 9b, 9c store dot data of colors Y, M and C. When all the data in these 3 memories is "1", it means BK(Y+M+C). The dot condition discrimination circuit 11 is operated in the following manner: it selects a small region of 6×6 pixels from dot data of each pixel outputted from the plain memories 9a to 9c; the necessity of smoothing processing is judged from the positional relation; and when necessary, information AN (used for the aforementioned smoothing processing) is outputted, wherein information AN includes information about a dot printing position, dot size and edge.

The printer body 5 includes a CPU, mechanical controller 16 (that conducts control of charging, exposure, transfer and fixing), video interface 10 (gate array of one chip) conducting image data processing (generation of timing for image data reading and writing, image data processing, and selection of command data), timing generation circuit 15, optical control section 17, and printing section 18. The video interface 100 includes an input conversion circuit 12, condition discrimination circuit 13, and printing condition storing register group 14. The timing of all operations is determined in accordance with index signal IND (index signal IND shows that a beam has come to a predetermined position close to a tip of an image formed on the photoreceptor) obtained from the printing section 18. That is index signal IND is supplied to the timing generation circuit 15, and a high speed clock (5 MHz), the phase of which is synchronized, is generated, and the high speed clock is sent to the printer controller 3. Then, synchronously with the aforementioned operation, dot data is transmitted, and image processing is carried out in real time so that a printing operation is conducted.

Figure 7:
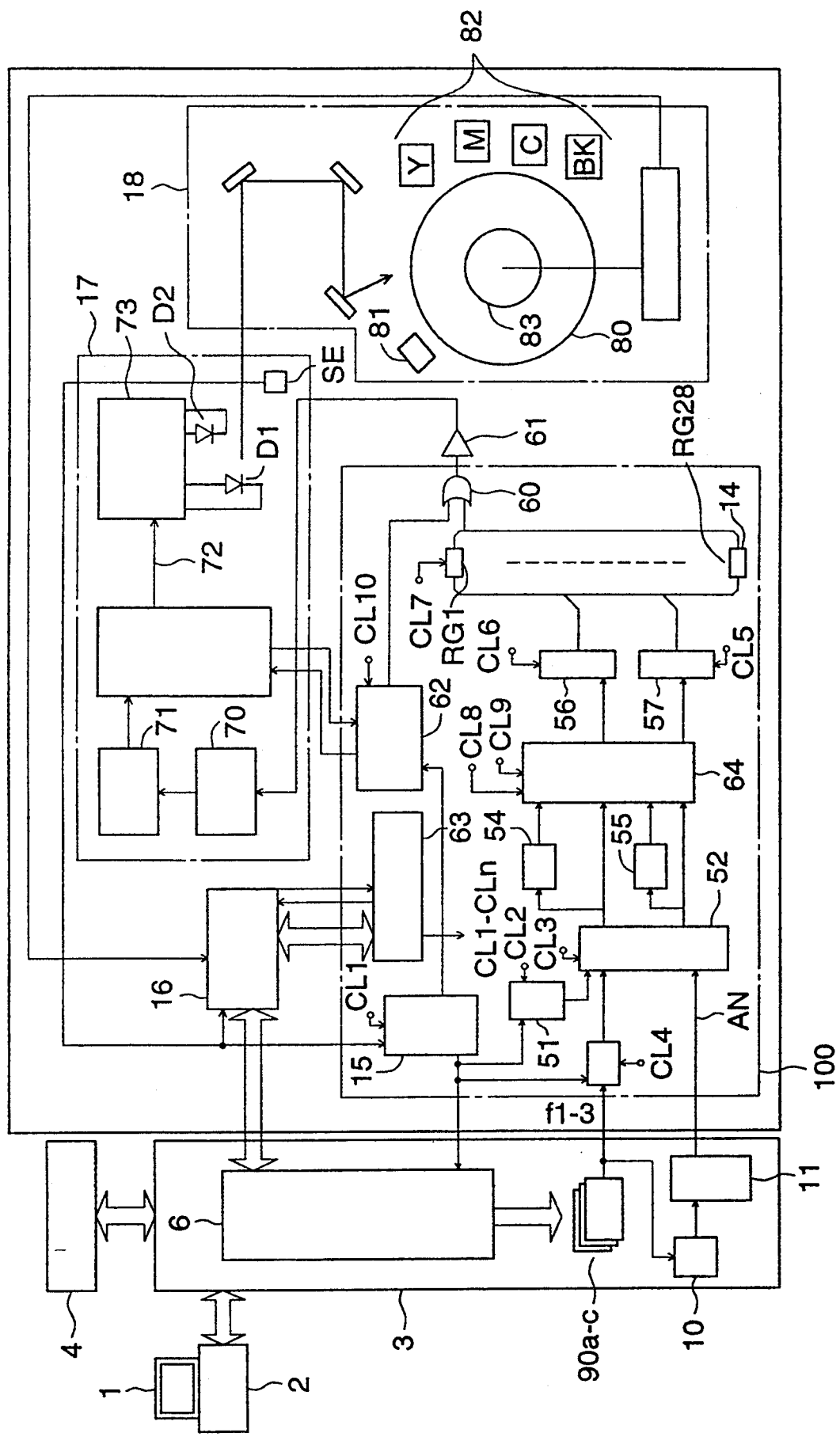
FIG. 7 is a view showing the structure of the example of the image forming apparatus of the present invention, wherein the example shown in FIG. 4 is specifically shown.
Figure 8:
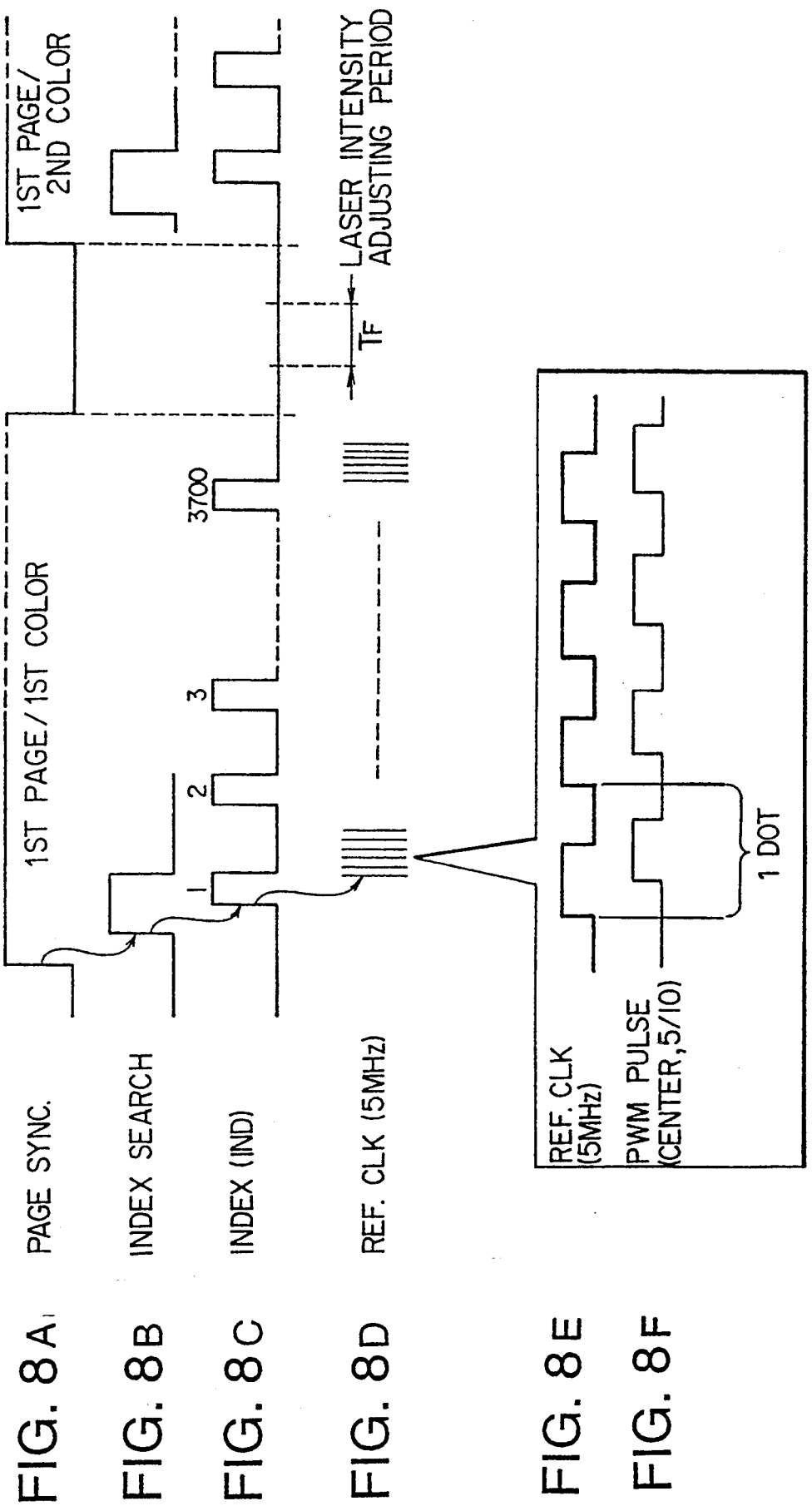
FIGS. 8A, 8B, 8C, 8D, 8E and 8F are timing charts explaining the operation timing of the apparatus shown in FIG. 7.

FIG. 7 is a view showing the detail of the example shown in FIG. 4. Although the structure of the apparatus in FIG. 7 is approximately the same as that in FIG. 4, the different point is that the timing circuit 15 is taken into the interface 100. Like parts in each of FIGS. 4 and 7 are identified by the same reference character. FIGS. 8A, 8B, 8C, 8D, 8E, 8F and 9–13 are views for explaining the characteristics of the structure of the apparatus shown in FIG. 7.

Figure 6:
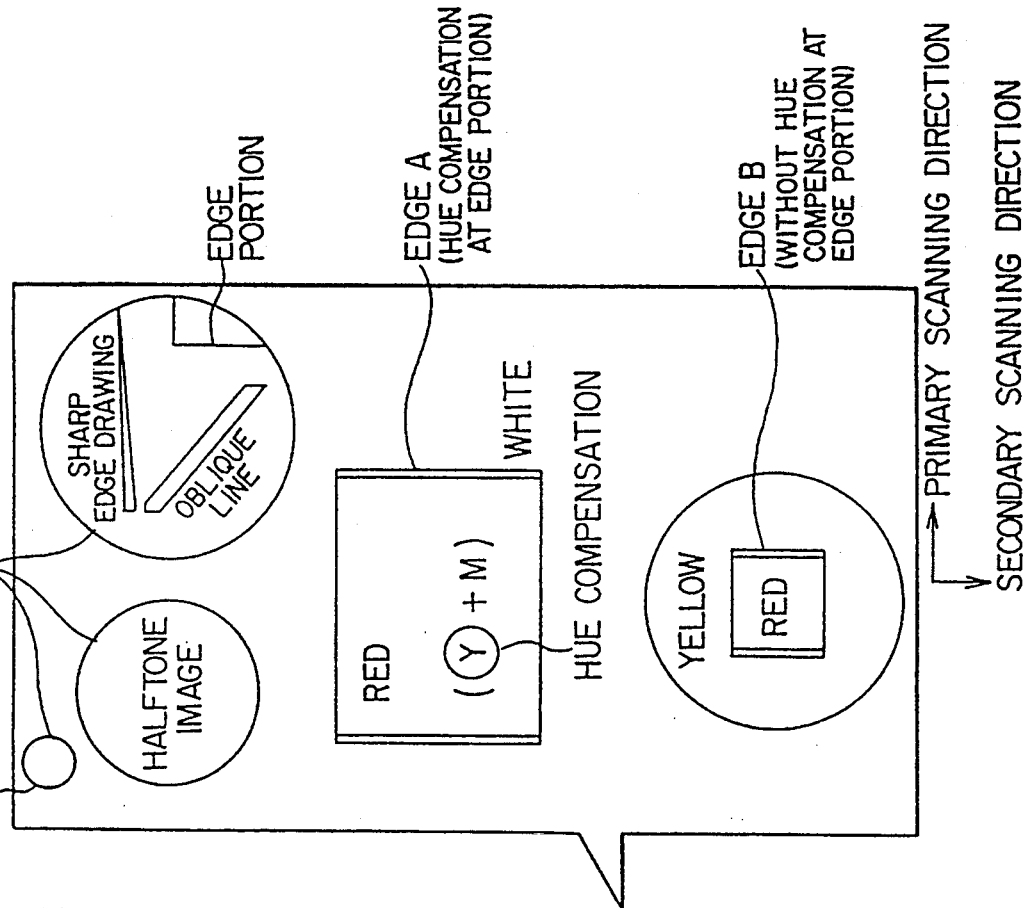
FIG. 6 is a view showing a smoothing processing mode and its effects.

As shown in FIG. 7, the video interface 100 in charge of image processing comprises an input conversion circuit 12, a mode conversion circuit 64 that changes the mode shown in FIG. 6, test pattern generator (TP) 51, selector 52, monocolor detection circuit (MO) 54, edge detection circuit (EG) 55, video control circuit 56, smoothing processing control circuit (SO) 57, register groups RG1 TO RG28 (14), OR circuit 60, laser control circuit 62, and control circuit 63 that controls the operations of the aforementioned circuit, wherein the control circuit 63 exchanges information with the CPU and mechanical controller 16 and outputs control signals CL1 to CLn to each circuit.

The input conversion circuit 12 converts a video signal sent from printer controller 3 into a 4 bit signal of Y, M, C and BK with regard to 1 dot. The test pattern generator (TP) 51 is ROM that can output a fixed test pattern without a controller. The test pattern and normal video input signal selectively pass through the selector 52. The monocolor detection circuit 54 detects a monocolor dot from the video signal, and notifies the mode conversion circuit 64 of the detected monocolor dot. The edge detection circuit (EG) 55 decodes 5 bit control signal AN for smoothing processing sent from the printer controller 3, and in the case where edge data is received, the edge detection circuit (EG) 55 notifies the mode conversion circuit 64 of the edge data. The mode conversion circuit 64 generates an output corresponding to mode A and mode B shown in FIG. 11. When a changing command of the dot (beam) placement and dot size is received, the smoothing processing control circuit (SO) 57 preferentially conducts smoothing processing while nonactive terminal E of the video control circuit 56 is made active, and accesses one of registers RG1 to RG28 that stores the necessary condition, and the code is outputted. The video control circuit 56 is activated in the case where smoothing processing is not conducted, and accesses one of registers RG1 to RG28 that stores the necessary condition, and the code is outputted. The data driver 61 transmits the code to the optical control section 17.

The optical control section section 17 includes a data decoder 70, PWM modulation circuit 71, laser on/off signal generator 72, laser driver 73, writing laser diode D1, monitoring photodiode D2, and index signal receiving photosensor SE. The printing section 80 includes a photosensitive drum 80, charger 81, and 4 color developing unit 82. The rotation of the photoreceptor drum 80 is controlled by a stepping motor 83. The rotation is synchronized with the index signal, and in the case where more accurate control is required, the revolution speed is detected by an encoder and closed loop control is conducted by the CPU and the mechanical controller 16.

TIMING CONTROL OF ACTIONS

FIGS. 8A, 8B, 8C, 8D, 8E and 8F are timing charts to explain the operation timing of a printer shown in FIG. 7. In the timing circuit 15, an operation clock of 5 MHz is generated in accordance with index signal IND, and processing at each dot is carried out synchronously with the clock. When the index signal is counted to 3700, the photoreceptor drum 80 is rotated by 1 revolution, and development of the first color corresponding to one page is completed. In the period of time from the completion of development of the first color to the start of development of the second color, intensity adjustment of laser beams is carried out.

INPUT OF VIDEO (DOT) DATA

Figure 9:
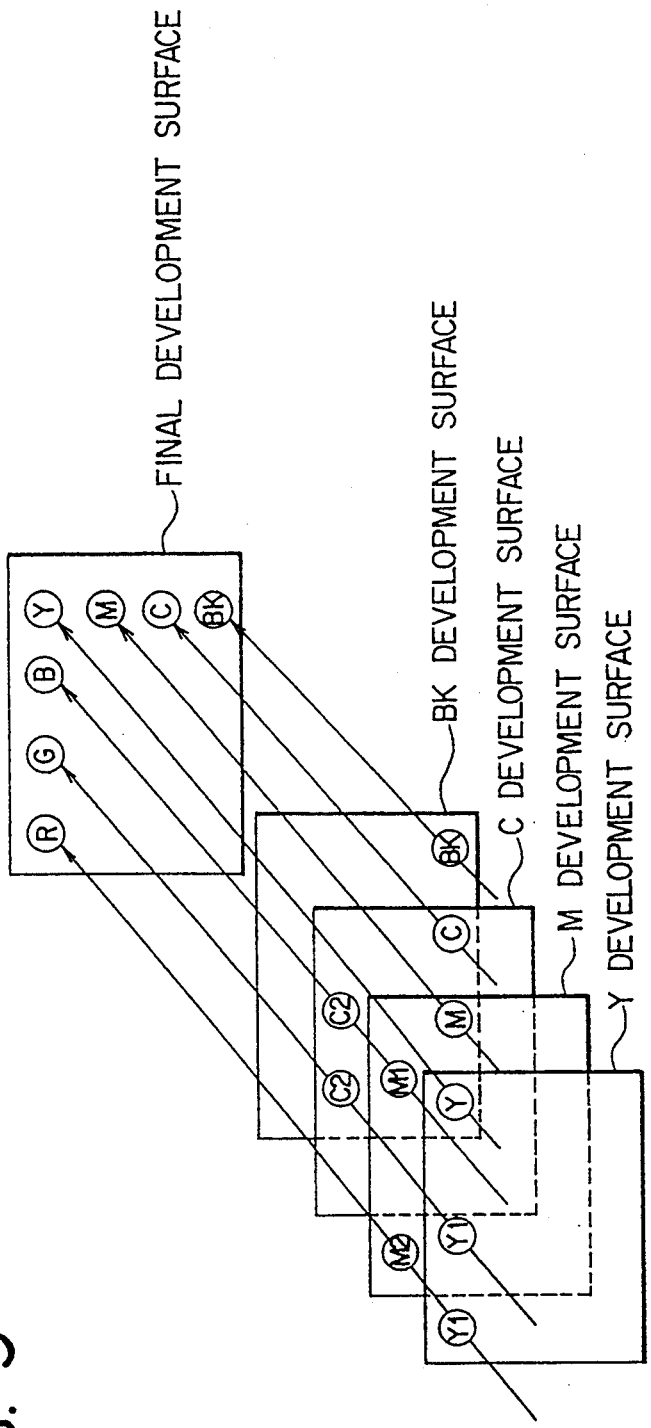
FIG. 9 is a view explaining the combination of colors necessary for realizing a multicolor image of 7 colors.

As shown in FIG. 9, in order to reproduce a multicolor image of 7 colors, it is necessary to provide developing surface data of 4 colors of Y, M, C and BK. In this example, as shown in FIG. 10, frame memories 9a, 9b and 9c corresponding to each color of Y, M and C are provided, and dot data f1, f2 and f3 at each color is outputted to the input conversion circuit 12. The input conversion circuit 12 judges the meaning (shown on the right of FIG. 4) of the input signal from data f1, f2 and f3, and information CSEL expressing the present developing color that is given by the CPU and the mechanical controller 16, and the input conversion circuit 12 outputs information expressing superimposition of colors.

CONTENTS OF INFORMATION "AN" REPRESENTING COMMAND INFORMATION ABOUT THE DOT PRINTING PLACEMENT, DOT SIZE AND EDGE

As shown in FIG. 7 (FIG. 4), information "AN" used for smoothing processing is outputted as 5 bit data by the condition discriminating circuit 11 in the printer controller 3. Whether or not they are the dot placement and dot size edge corresponding to the code, is shown in FIG. 11. In this drawing, "Full" indicates dots that are not subjected to the smoothing processing. The video interface 100 discriminates the code according to the conditions described above, and judges whether the smoothing processing is carried out or not, and further judges whether the edge processing is carried out or not.

SELECTION OF CORRECTION CONDITIONS BY DESIGNATING A REGISTER

In the printer of this example, it is necessary to judge the correction conditions in real time and send them to the optical control section, so that high speed processing is required. On the other hand, the dot size and dot placement are finely controlled, so that there are provided a large number of correction conditions. Accordingly, there is a possibility that signal processing is delayed. Therefore, as shown in FIGS. 4 and 7, the register is provided at each correction condition, so that the correction condition is not directly outputted, but it is indirectly outputted when the register number is designated. In the manner described above, correction conditions can be controlled by the register numbers, so that processing speed can be raised and control can be easily performed. Stored data in RG1 to RG28 can be easily changed by operating the keyboard 4. The conditions stored in the registers (0 to 28), that is, the meaning of the stored data is shown in FIG. 12.

SIMPLIFICATION OF THE CONTROL MECHANISM FOR WRITING BEAMS

Figure 13:
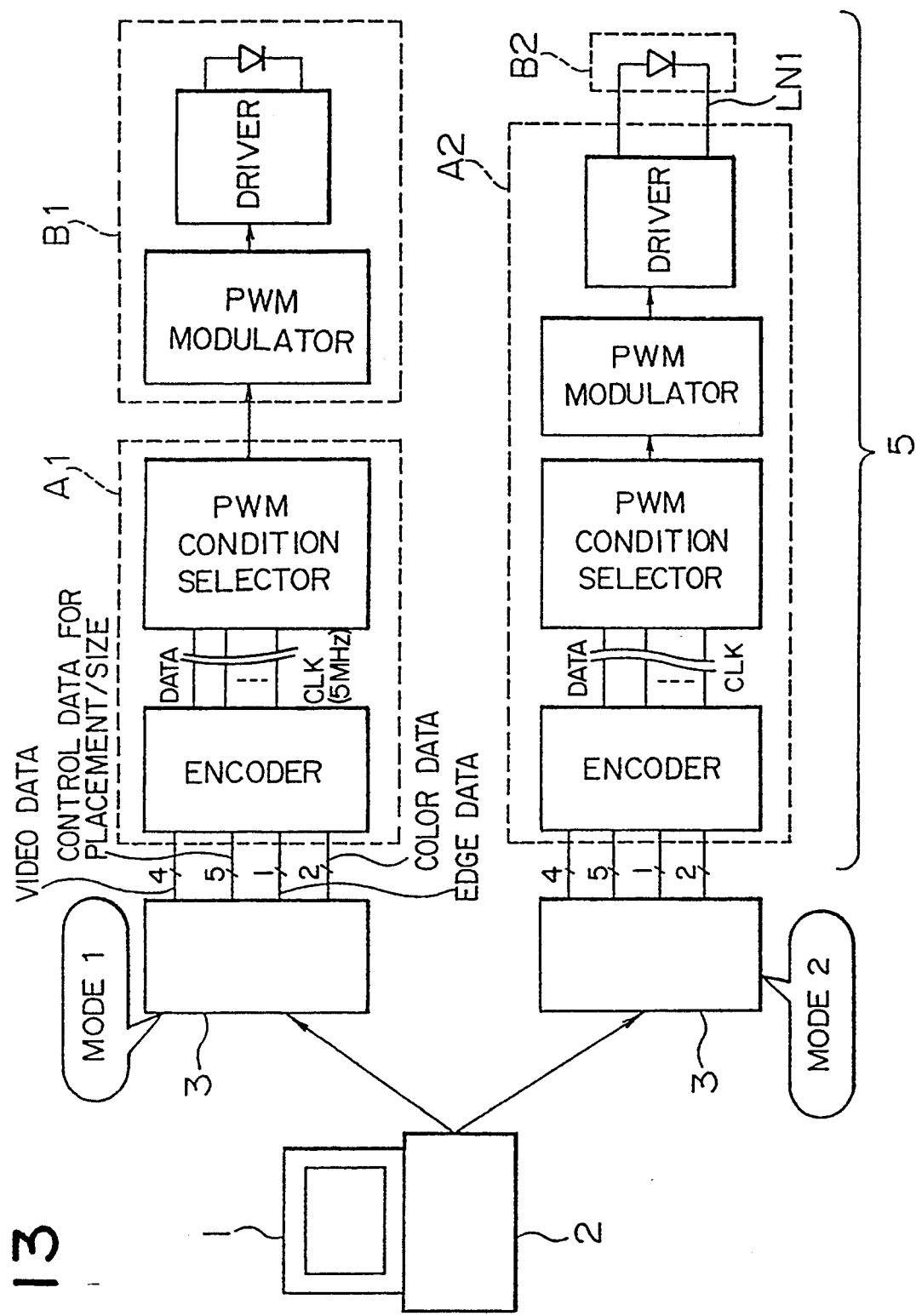
FIG. 13 is a view showing the simplification of a writing beam control mechanism.
Figure 14C:
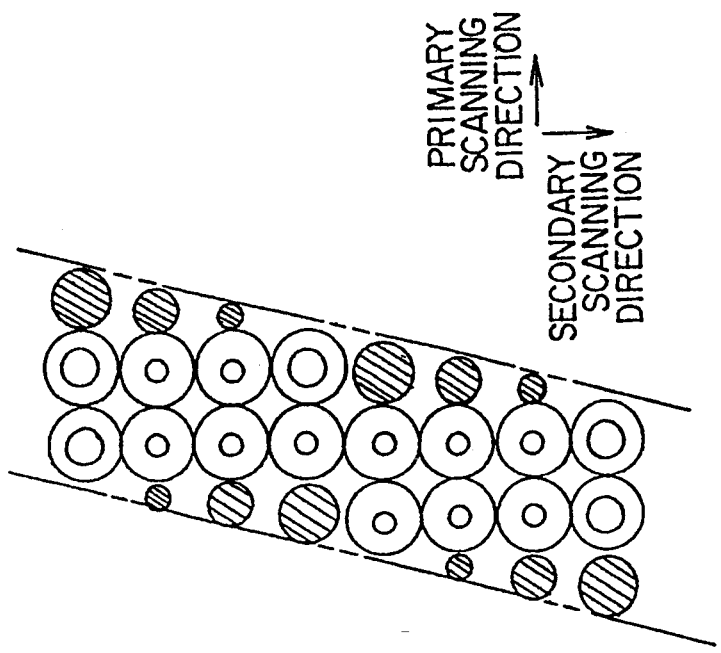
FIGS. 14(a), 14(b) and 14(c) are a view explaining the characteristics of dot formation of the present invention, wherein a case is taken for an example in which a red (R=Y+M) diagonal line is printed.
Figure 14B:
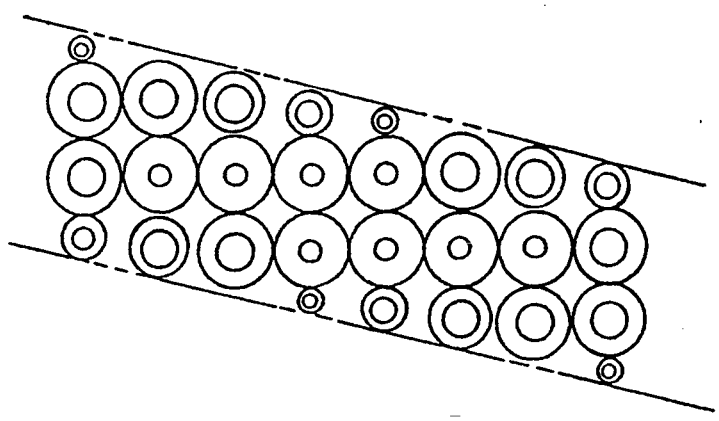
Figure 14A:
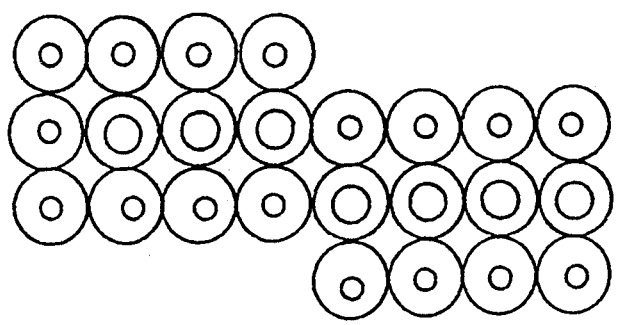

In the apparatus of this example, it is necessary to provide not only signal processing conducted in real time but also accurate scanning conducted by laser beams in accordance with PWM-modulated waves. Therefore, there is a tendency that the structure becomes complicated. Accordingly, as shown in FIG. 13, consideration has been given to the relation between signal processing system A and laser beam scanning system B in order to simplify the structure of laser beam scanning system B to the utmost. That is, as shown in the upper portion in FIG. 13 (form 1), the structure is simplified in the following manner: selection of the printing conditions is carried out by video interface A1; only its encoding signal is sent to structure B1 so that only the laser driver and the PWM modulation circuit are provided on B1 side. In the structure described above, the amount of data transmitted from A1 to B1 can be reduced. In the lower portion of FIG. 13 (form 2), all signal processing is conducted by structure A2, so that only the laser is lit in structure B2. A2 and B2 are connected by transmission line LN1 of low transmission loss, so that the deformation of the drive pulse can be reduced.

FUNCTION OF THIS PRINTER

As described before with reference to column (4) of FIG. 15, the printer of this example is provided with the following function: edge hue correction is conducted concurrently with the smoothing processing; and the contents of the edge hue correction, that is, the PWM duty ratio of the first and second colors, is appropriately changed in accordance with the level of smoothing processing (the dot size level). Smoothing processing changes the size and placement of a dot in one pixel in the following manner: the generation timing of a pulse width signal (PWM signal) and the pulse width are controlled by a correction signal different from a reference signal. As shown in (a) to (c) in FIG. 16, the placement and size of a dot in one pixel can be changed. In this case, the writing position can be changed only in the primary scanning direction of a beam. When it is necessary to change the writing position also in the auxiliary scanning direction, the reflection surface angle of the polygonal mirror is changed, and the optical path formed by the lens is also changed as shown in (d) of FIG. 16. As shown in the lower portion of FIG. 16, when smoothing processing is carried out, image quality of a sharp image can be improved.

STRUCTURE OF THE APPARATUS TO CARRY OUT MULTICOLOR PROCESSING, SMOOTHING PROCESSING, AND DYNAMIC EDGE HUE CORRECTION

Figure 15:
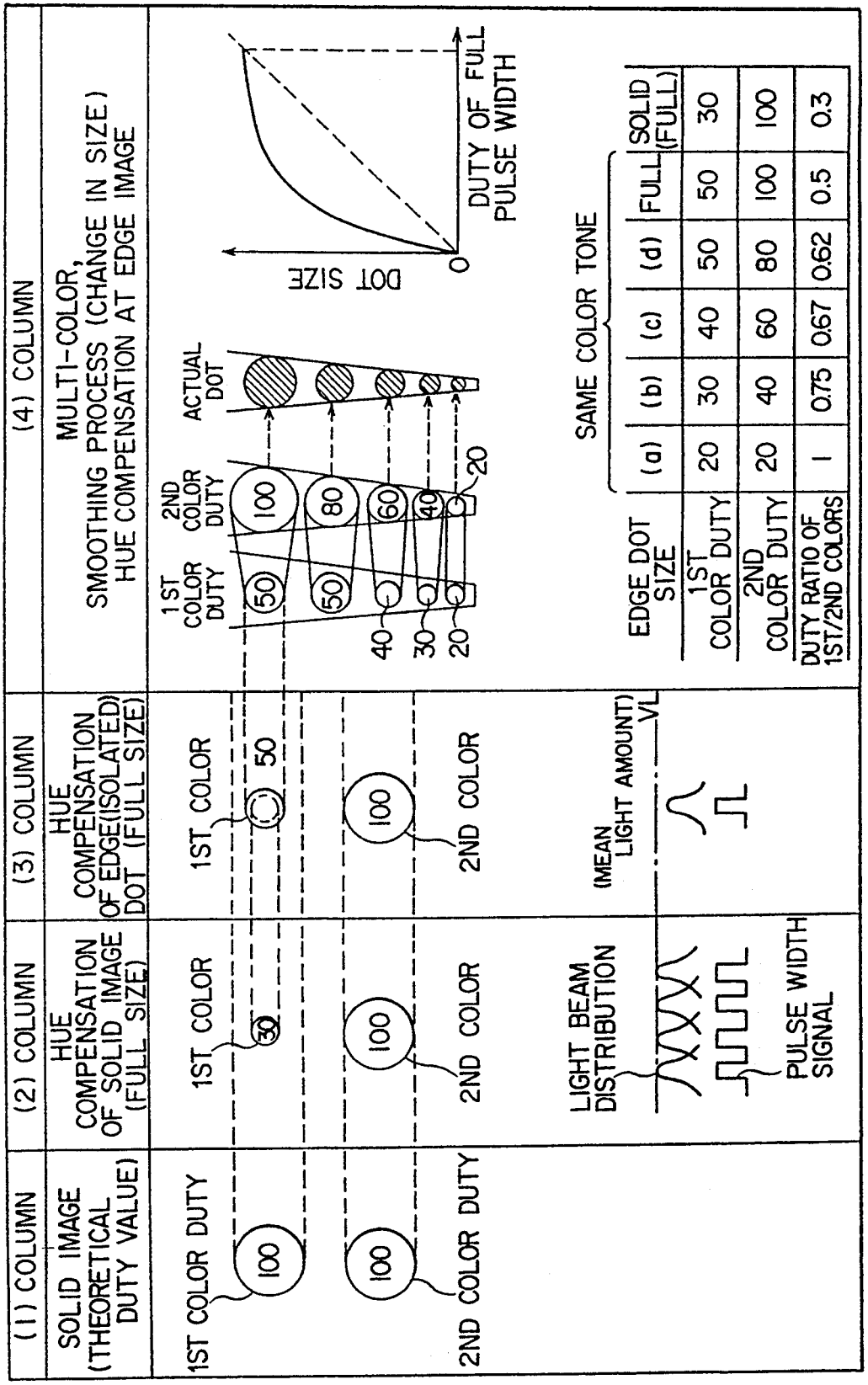
FIG. 15 is a view explaining the characteristics of the image forming apparatus of the present invention, wherein the characteristics are shown on a table.
Figure 16:
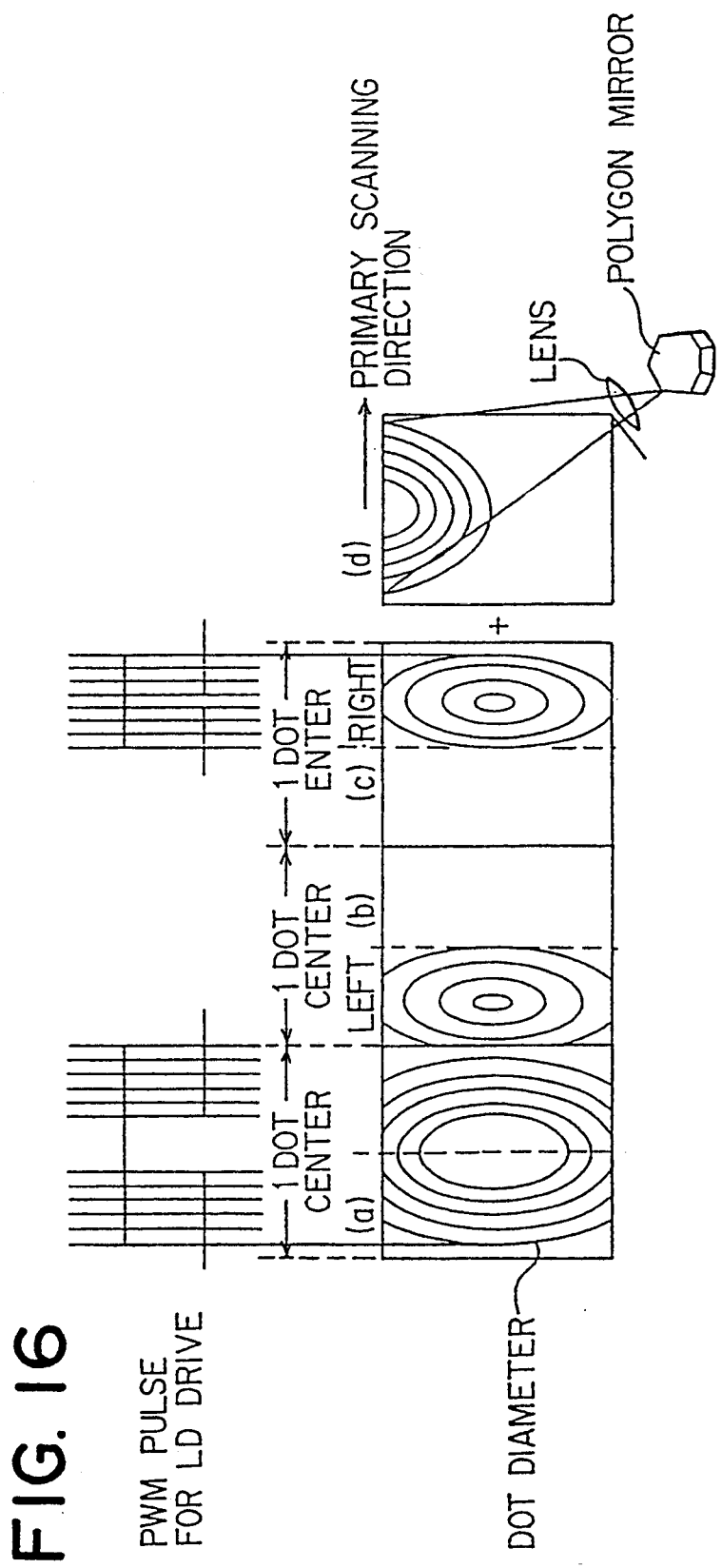
FIG. 16 is a view explaining the smoothing function of the apparatus of the present invention.
Figure 17:
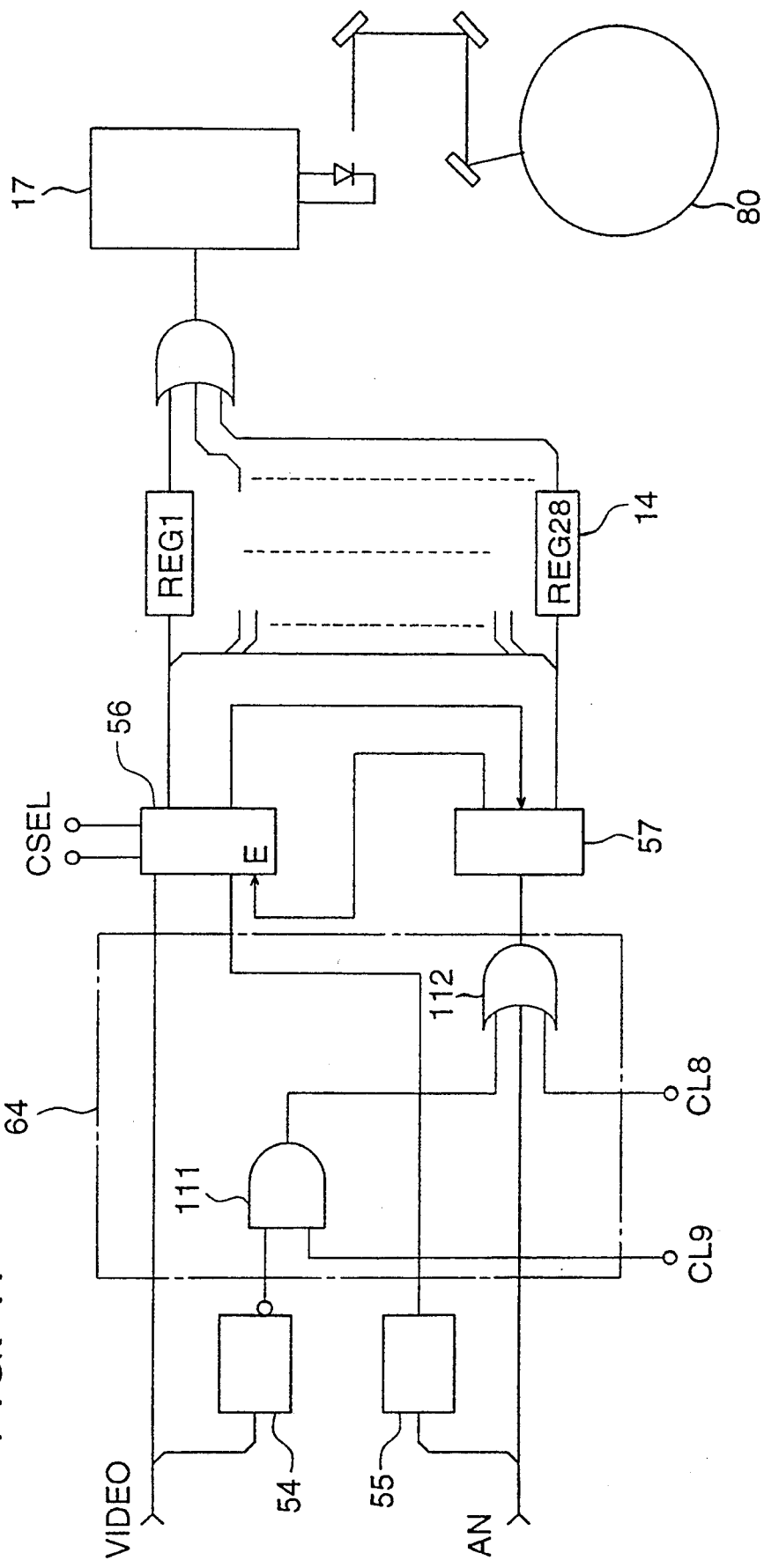
FIG. 17 is a view showing the structure of an important portion of the present invention, that is, showing the structure of the condition discriminating circuit 13 shown in FIG. 4.

FIG. 17 is a view showing the structure of the condition discrimination processing circuit 13 illustrated in column (4) of FIG. 15.

The condition discrimination processing circuit 13 includes a monocolor detection circuit (MO) 54, edge detection circuit (EG) 55, mode conversion circuit 64, video control circuit 56, and smoothing processing control circuit (SO). The mode conversion circuit 64 changes over the mode shown in FIG. 6, and is controlled by control signals CL8 and CL9 sent from mechanical controller CPU. In the case of mode A shown in FIG. 6, CL8 is maintained on HI level, and in the case of mode B, CL8 is maintained on HI level.

The smoothing processing control circuit (SO) 57 changes over between mode C shown in CL10 and other modes in accordance with CL10. In the case of mode C, the smoothing processing control circuit (SO) 57 conducts a correcting calculation, and in the case of other modes, it does not conduct a calculation, and selects a register in accordance with the code shown in FIG. 11. In the case where AN is a code of Full shown in FIG. 11, the smoothing processing is not conducted, and an enabling signal is sent to the video control circuit 56. The video control circuit 56 selects a register for color correction (for the edge and the entire image) according to a CSEL signal representing the present developing color, a video signal, and an edge signal sent from the edge detection circuit (EG) 55. At the same time, the video control circuit 56 sends the data (superimposition and developing color) for correcting mode C, to the smoothing processing control circuit (SO) 57.

When the aforementioned processing is carried out, modes A to D in FIG. 6 are changed over in accordance with the command sent from mechanical controller CPU, so that the most appropriate register is selected from the registers 1 to 28 at each dot according to the video data, AN signal, and CSEL data. Data is previously set in each register, and in accordance with the data, the PWM control circuit in the optical control section 17 is activated to drive the semiconductor laser (light source). As shown in column (4) of FIG. 15, while the exposure amounts of the first and second colors are restricted with regard to the multicolor edge dot, an electrostatic latent image is formed on the photoreceptor drum 80.

In the above Example, both the toner adhesion amount adjusting means and the smoothing processing means are realized when the pulse width signal to drive the light source is controlled. However, the present invention is not necessarily restricted to the aforementioned specific means. With regard to the toner adhesion amount adjusting means, power adjustment of the light source (laser) can be carried out individually or together with pulse width control. When the toner adhesion amount is adjusted uniformly, for example, when the developing bias, sleeve rotating speed and toner density are adjusted together with the aforementioned adjusting operation, density adjustment can be concurrently carried out all over the image screen. Therefore, an isolated portion or an edge portion can be reproduced excellently in the color toner image provided by the present invention.

There are two modes, one is a monocolor mode and the other is a multicolor mode. The modes can be selected when an operation is conducted at the host or the operation panel.

When the multicolor mode is selected, a plurality of developing or transferring operations are conducted on the image carrier or transfer sheet so that images can be superimposed. In this case, there is a possibility that the dots composed of monocolor toner and the dots composed of a plurality of toners are mixed in the same image.

In the case of the monocolor mode, the aforementioned superimposing process is eliminated.

FIGS. 18(a) and 18(b) explain an example. FIG. 18(a) shows a case in which a smoothing operation is conducted in the case where the monocolor mode is designated. FIG. 18(b) shows a case in which only a color correcting operation is conducted in the case of the multicolor mode. The color correcting operation shown in FIG. 18(b) is carried out in the following manner: the pulse width of the first color and that of the second color are changed so that the color tone can not be different with respect to the hatched dots and the not-hatched dots in the case of the edge and isolated dots.

FIG. 19 shows an example in which a-color image is processed in the case where a monochromatic image and multicolor image are mixed.

Region A represents a case in which the edge portion of a monocolor image is processed. This is an example in which the operation is conducted in the following manner: when PWM control of the semiconductor laser is conducted in an image exposure operation, the pulse width signal is controlled in the edge portion indicated by black circles so that dot size and/or dot position can be changed dot by dot and the dots can be contacted with the dots except for the dots of edge portion expressed by white circles. As a result of the foregoing, the diagonal lines and the tip portion of the edge of the monocolor image are subjected to the smoothing and reproduced with high resolution.

Region B shows a case in which the isolated dots and the edge dots of a multicolor image are processed, and in this case, only hue correction is carried out.

With respect to the hatched dots, in the case of PWM control of the semiconductor laser, the pulse width signal of the first and/or the second color is controlled in the image exposure process so that the hue of the hatched dots can be reproduced in the same manner as the hue of the dots of white circles. Specifically, the ratio of the pulse width of the first color and that of the second color is determined in accordance with the dot size and the hue to be reproduced. As shown in region C, in the case of a multicolor image, both the color correcting operation and the smoothing operation may be carried out. In this case, with regard to the edge dots and isolated dots of multicolor, not only the pulse width ratio of the first and second colors but also the dot position is controlled so that they can be contacted with the dots except for the edge dots represented by white circles. As a result of the foregoing, hue reproduction can be excellently carried out. Further, smoothing effects can be also provided so that a color image of high quality can be obtained.

An example is shown in (4) of FIG. 15. In the case of multicolor processing, only the smoothing operation may be conducted and the color correction may be omitted for simplification.

What is claimed is:

1. An electrophotographic color image forming apparatus comprising:
   (a) an imagewise dot exposure apparatus for emitting a light beam toward an image carrier;
   (b) a receiver, including said image carrier, for receiving a color image data and a smoothing information data for each of a plurality of pixels forming a color image, wherein said color image data indicates at least a first color component information and a second color component information for each of said plurality of pixels forming said color image, and said smoothing information data indicates whether a respective pixel of said color image is to be subjected to a smoothing process;
   (c) control means including a first exposure control modulator for modulating said light beam in accordance with said first color component information so as to form a first latent dot image with a first amount of exposure on said image carrier;
   (d) first developing means for developing said first latent dot image to form a first colored toner dot image on said image carrier;
   (e) said control means further including a second exposure control modulator for modulating said light beam in accordance with said second color component information so as to form a second latent dot image with a second amount of exposure on said image carrier;
   (f) second developing means for developing said second latent dot image to form a second colored toner dot image on said image carrier;
   (g) a smoothing processor for adjusting at least one of a size and a position of at least one of said first and said second colored toner dot images within each pixel based on said smoothing information data;
   (h) a discriminator for discriminating those ones of said plurality of pixels which have said second color toner dot image superimposed on said first color toner dot image in accordance with said first and second color component information; and
   (i) a hue corrector for adjusting a ratio of said first amount of exposure to said second amount of exposure to control said first and second exposure control modulators based on a discrimination result of said discriminator.

2. The apparatus of claim 1, wherein said hue corrector does not adjust said ratio for those pixels which are subjected to a smoothing operation of said smoothing processor.

3. The apparatus of claim 1, further comprising:
   a selector for selecting one of a monochromatic mode and a color mode; and
   wherein said control means controls said smoothing processor when said selector selects said monochromatic mode.

4. The apparatus of claim 1, wherein said first and second exposure control modulators of said control means respectively comprise a light intensity controller for controlling said light beam so as to change said first and second amounts of exposure on said image carrier.

5. The apparatus of claim 4, wherein said light beam is a laser beam.

6. The apparatus of claim 1, wherein said smoothing processor comprises a pulse width controller for adjusting the at least one of the size and the position of said at least one of said first and second colored toner dot images within each pixel.

7. The apparatus of claim 1, wherein said first and second colored toner dot images are sequentially registered on said image carrier.

* * * * *